(12) United States Patent
Yoshida

(10) Patent No.: US 8,970,538 B2
(45) Date of Patent: Mar. 3, 2015

(54) TOUCH SENSOR SYSTEM

(71) Applicant: Sharp Kabushiki Kaisha, Osaka-shi, Osaka (JP)

(72) Inventor: Shinichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/366,945

(22) PCT Filed: Dec. 19, 2012

(86) PCT No.: PCT/JP2012/082967
§ 371 (c)(1),
(2) Date: Jun. 19, 2014

(87) PCT Pub. No.: WO2013/094656
PCT Pub. Date: Jun. 27, 2013

(65) Prior Publication Data
US 2014/0362046 A1    Dec. 11, 2014

(30) Foreign Application Priority Data
Dec. 21, 2011    (JP) .................................. 2011-280581

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 2203/04104* (2013.01)

USPC ......................................................... 345/173

(58) Field of Classification Search
USPC ........................................ 345/173, 174, 179
See application file for complete search history.

(56) References Cited

U.S. PATENT DOCUMENTS

| 7,812,827 | B2 | 10/2010 | Hotelling et al. |
| 7,812,828 | B2 | 10/2010 | Westerman et al. |
| 2006/0017709 | A1 | 1/2006 | Okano |
| 2009/0095540 | A1 | 4/2009 | Zachut et al. |
| 2011/0147101 | A1* | 6/2011 | Bateman et al. ........... 178/18.06 |

FOREIGN PATENT DOCUMENTS

| JP | 2006-39686 A | 2/2006 |
| JP | 2011-501261 A | 1/2011 |
| JP | 2011-134069 A | 7/2011 |
| WO | WO 2013/001889 A1 | 1/2013 |

* cited by examiner

*Primary Examiner* — Adam R Giesy
(74) *Attorney, Agent, or Firm* — Birch, Stewart, Kolasch & Birch, LLP

(57) ABSTRACT

The present invention provides a touch sensor system which is capable of removing a hand-placing signal while mounting normal application software on a host device. A touch sensor system (1) includes a hand-placing removing process section (2) which detects a hand-placing region on a basis of strengths of capacitance signals, each strength being indicative of a change in capacitance and which replaces values of capacitance signals corresponding to respective capacitors provided in the detected hand-placing region with a nil value indicative of a state where not touch input is made.

4 Claims, 18 Drawing Sheets

TOUCH SENSOR SYSTEM

TECHNICAL FIELD

The present invention relates to a touch sensor system which detects an input with a stylus to a touch panel including a plurality of capacitors provided in a matrix manner.

BACKGROUND ART

Patent Literature 1 discloses a touch sensor system which detects distribution of values of a plurality of capacitors respectively provided at intersections of a plurality of first signal lines and a plurality of second signal lines. As shown in Patent Literature 2, a conventional touch sensor system configured to detect how capacitances are distributed has been trying to carry out recognition of a finger and part of a hand which are in contact with a touch panel by means of signal processing.

FIG. 18 is a block diagram illustrating a configuration of a conventional touch sensor system 91. The touch sensor system 91 includes a touch panel 93 and a capacitance distribution detecting circuit 92. The touch panel 93 includes drive lines HL1 to HLn provided in parallel with each other in a horizontal direction, sense lines VL1 to VLm provided in parallel with each other in a vertical direction, and a plurality of capacitors respectively provided at intersections of the drive lines HL1 to HLn and the sense lines VL1 to VLm.

The capacitance distribution detecting circuit 92 includes a driver 95. The driver 95 drives the capacitors by applying voltages to the drive lines HL1 to HLn in accordance with a code sequence. The capacitance distribution detecting circuit 92 is provided with a sense amplifier 96. The sense amplifier 96 reads out, through the sense lines VL1 to VLm, a linear sum of voltages corresponding to the capacitors driven by the driver 95, and supplies the linear sum to an AD converter 98. The AD converter 98 converts, from analogue to digital, the linear sum and supplies the linear sum thus converted to a capacitance distribution calculation section 99.

The capacitance distribution calculation section 99 calculates distribution of capacitances on the touch panel 93 on a basis of (i) the linear sum of the voltages corresponding to the capacitors, which sum has been supplied from the AD converter 98, and (ii) the code sequence, and supplies the calculated distribution of capacitances on the touch panel 93 to a touch recognition section 90. The touch recognition section 90 recognizes a touched position on the touch panel 93, on a basis of the distribution of capacitances which has been supplied from the capacitance distribution calculation section 99.

The capacitance distribution detecting circuit 92 includes a timing generator 97. The timing generator 97 generates a signal for specifying an operation of the driver 95, a signal for specifying an operation of the sense amplifier 96, and a signal for specifying an operation of the AD converter 98, and supplies the signals to the driver 95, the sense amplifier 96, and the AD converter 98, respectively.

Furthermore, there is also known a configuration in which a hand-placing region which is a region of a touch panel including a plurality of capacitors provided in a matrix manner and on which region a hand is placed in order to make an input with a stylus to the touch panel is specified by application software mounted on a host device connected with a touch sensor system, a frame indicative of the hand-placing region is drawn, and a position of the hand-placing region is changed appropriately in accordance with movement of the hand placed on the touch panel in order to make an input with the stylus.

CITATION LIST

Patent Literatures

[Patent Literature 1]
U.S. Pat. No. 7,812,827, specification (published on Oct. 12, 2010)
[Patent Literature 2]
U.S. Pat. No. 7,812,828, specification (published on Oct. 12, 2010)

SUMMARY OF INVENTION

Technical Problem

However, the above configuration has a problem as follows. In the configuration, the application software for specifying a hand-placing region which is a region of the touch panel including a plurality of capacitors provided in a matrix manner and on which region a hand is placed in order to make an input with a stylus to the touch panel and for appropriately changing the position of the hand-placing region in accordance with movement of the hand placed on the touch panel in order to make an input with the stylus is mounted on the host device. Accordingly, such a configuration for automatic setting of the hand-placing region etc. requires newly developing application software to be mounted on the host device in order to make automatic setting of the hand-placing region etc.

An object of the present invention is to provide a touch sensor system which does not require specializing application software on the host device to have a function of displaying and moving the hand-placing region and which allows normal application software to be mounted on the host device so as to remove a signal generated by a hand placed on a hand-placing region and to detect a signal based on an input with a stylus without wrong recognition.

Solution to Problem

In order to solve the foregoing problem, a touch sensor system of the present invention is a touch sensor system, including: detection means for detecting a hand-placing region which is a region of a touch panel including a plurality of capacitors provided in a matrix manner and on which region a hand is placed in order to make an input with a stylus, said detecting being based on strengths of capacitance signals, each strength being indicative of a change in the corresponding capacitor; replacing means for replacing values of capacitance signals corresponding to respective capacitors provided in the hand-placing region detected by the detection means with a nil value indicative of a state where no touch input is made; and stylus input recognition means for outputting to a host device coordinates of the input with a stylus on a basis of (i) the capacitance signals replaced with said nil value by the replacing means and (ii) a capacitance signal corresponding to a capacitor provided outside the hand-placing region.

With the arrangement, the hand-placing region which is a region of a touch panel including a plurality of capacitors provided in a matrix manner and on which region a hand is placed in order to make an input with a stylus can be detected based on strengths of capacitance signals, each strength being indicative of a change in the corresponding capacitor, the values of capacitance signals corresponding to capacitors provided in the detected hand-placing region can be replaced with a nil value indicative of a state where no touch input is made, and coordinates of the input with a stylus can be outputted to a host device on a basis of (i) the capacitance signals replaced with said nil value and (ii) a capacitance signal corresponding to a capacitor provided outside the hand-placing region. Consequently, a configuration for displaying and moving the hand-placing region can be included only in the touch sensor system independently of the host device.

Consequently, it is possible to provide a touch sensor system which does not require specializing application software on the host device to have a function of displaying and moving the hand-placing region and which allows normal application software to be mounted on the host device so as to remove a signal generated by a hand placed on a hand-placing region and to detect a signal based on an input with a stylus without wrong recognition.

Advantageous Effects of Invention

With the touch sensor system of the present invention, the hand-placing region which is a region of a touch panel including a plurality of capacitors provided in a matrix manner and on which region a hand is placed in order to make an input with a stylus can be detected based on strengths of capacitance signals, each strength being indicative of a change in the corresponding capacitor, the values of capacitance signals corresponding to capacitors provided in the detected hand-placing region can be replaced with a nil value indicative of a state where no touch input is made, distribution of a change in capacitance caused by the input with a stylus can be calculated on a basis of (i) the capacitance signals replaced with said nil value and (ii) a capacitance signal corresponding to a capacitor provided outside the hand-placing region, and coordinates of the input with a stylus can be outputted to a host device on a basis of the calculated distribution of a change in capacitance.

Consequently, a configuration for displaying and moving the hand-placing region can be included only in the touch sensor system independently of the host device. Consequently, it is possible to provide a touch sensor system which does not require specializing application software on the host device to have a function of displaying and moving the hand-placing region and which allows normal application software to be mounted on the host device so as to remove a signal generated by a hand placed on a hand-placing region and to detect a signal based on an input with a stylus without wrong recognition.

Figure 3:
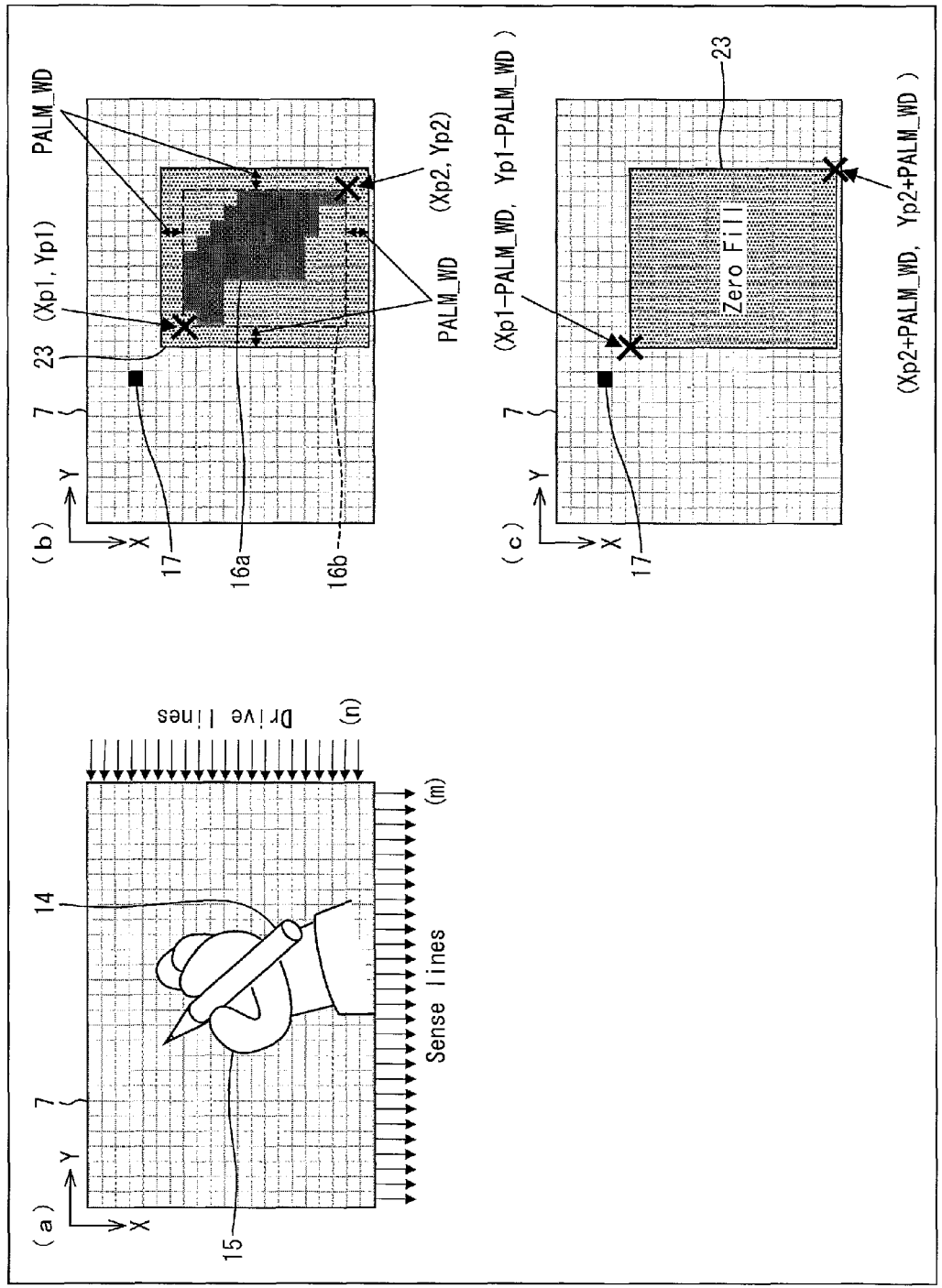

(a) of FIG. 3 to (c) of FIG. 3 are views illustrating how to detect a hand-placing region in the touch sensor system.

Figure 4:
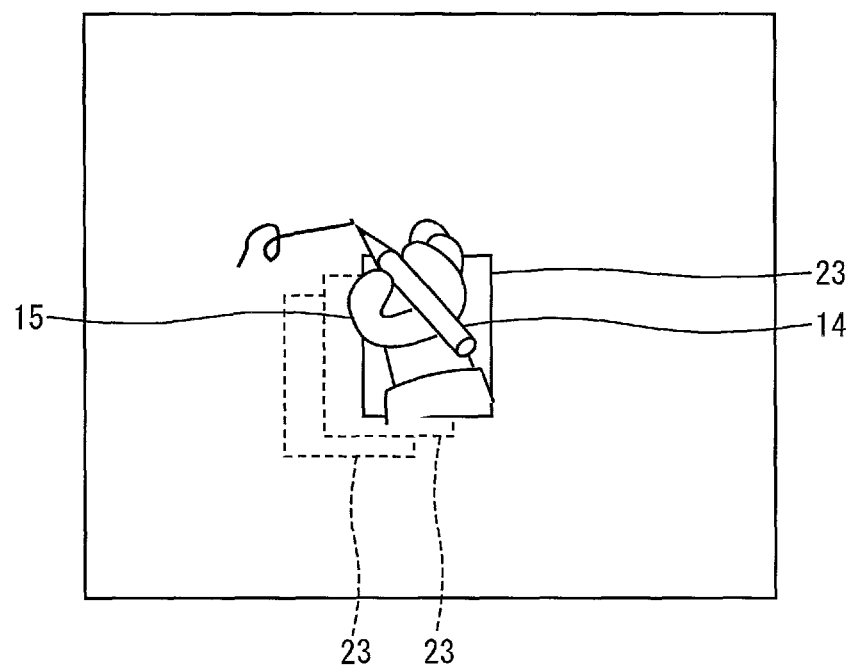

FIG. 4 is a view illustrating automatic movement of the hand-placing region.

Figure 5:
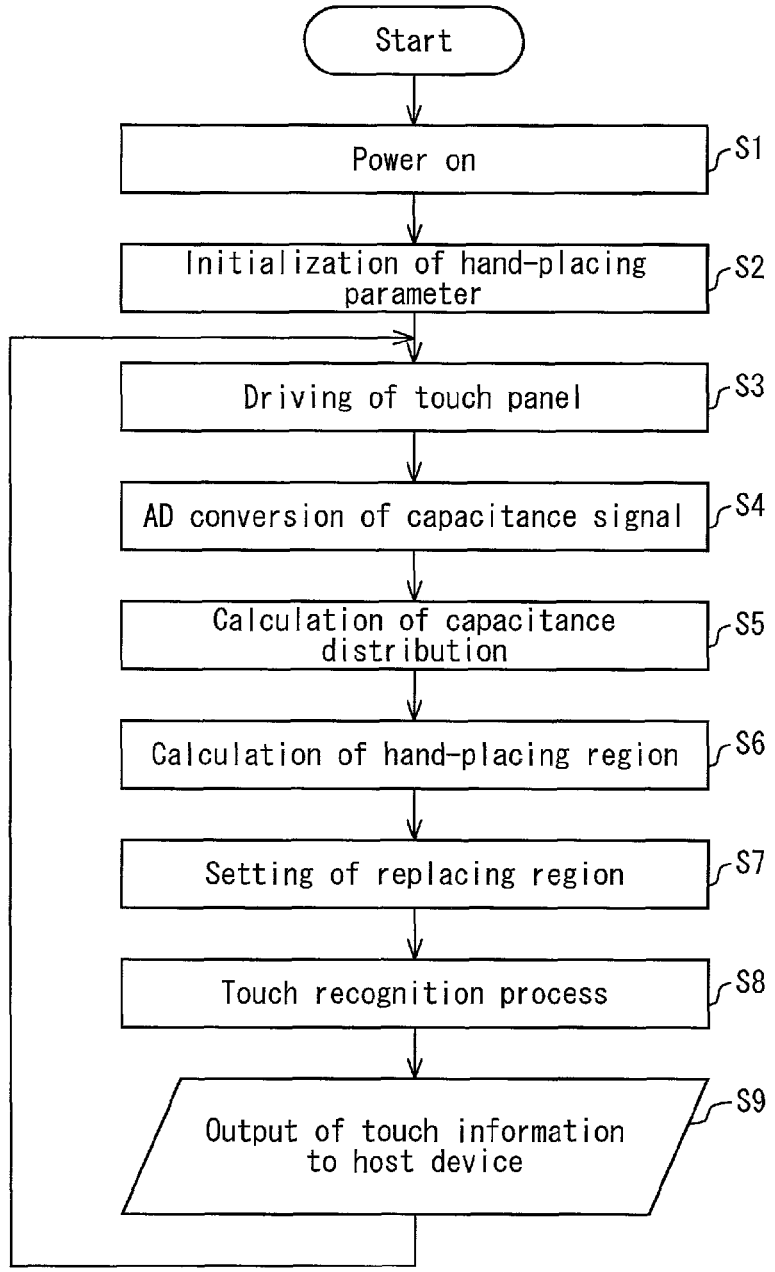

FIG. 5 is a flowchart illustrating an operation of the touch sensor system.

Figure 6:
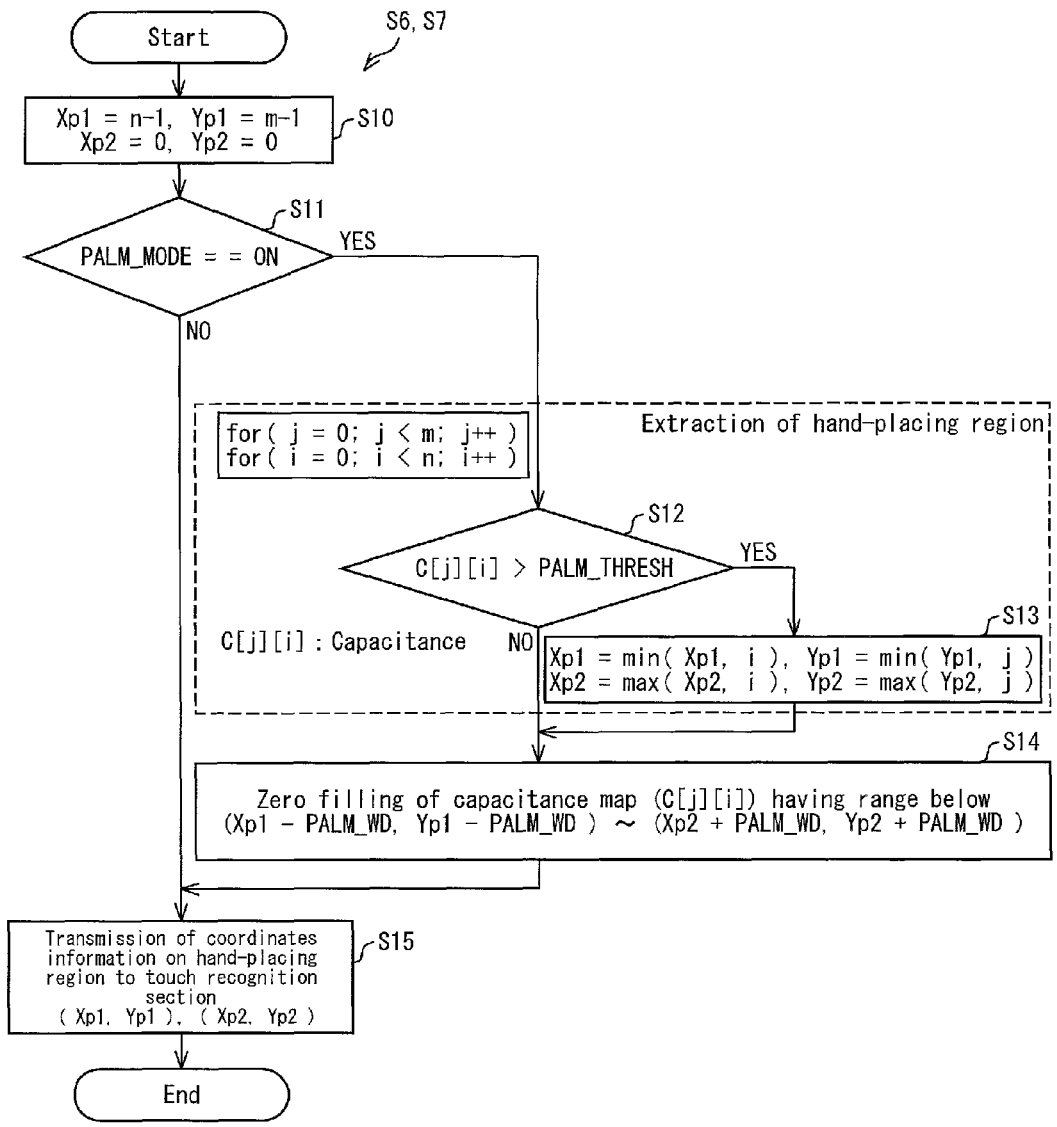

FIG. 6 is a flowchart illustrating an operation of the hand-placing removing process section provided in the touch sensor system.

Figure 7:
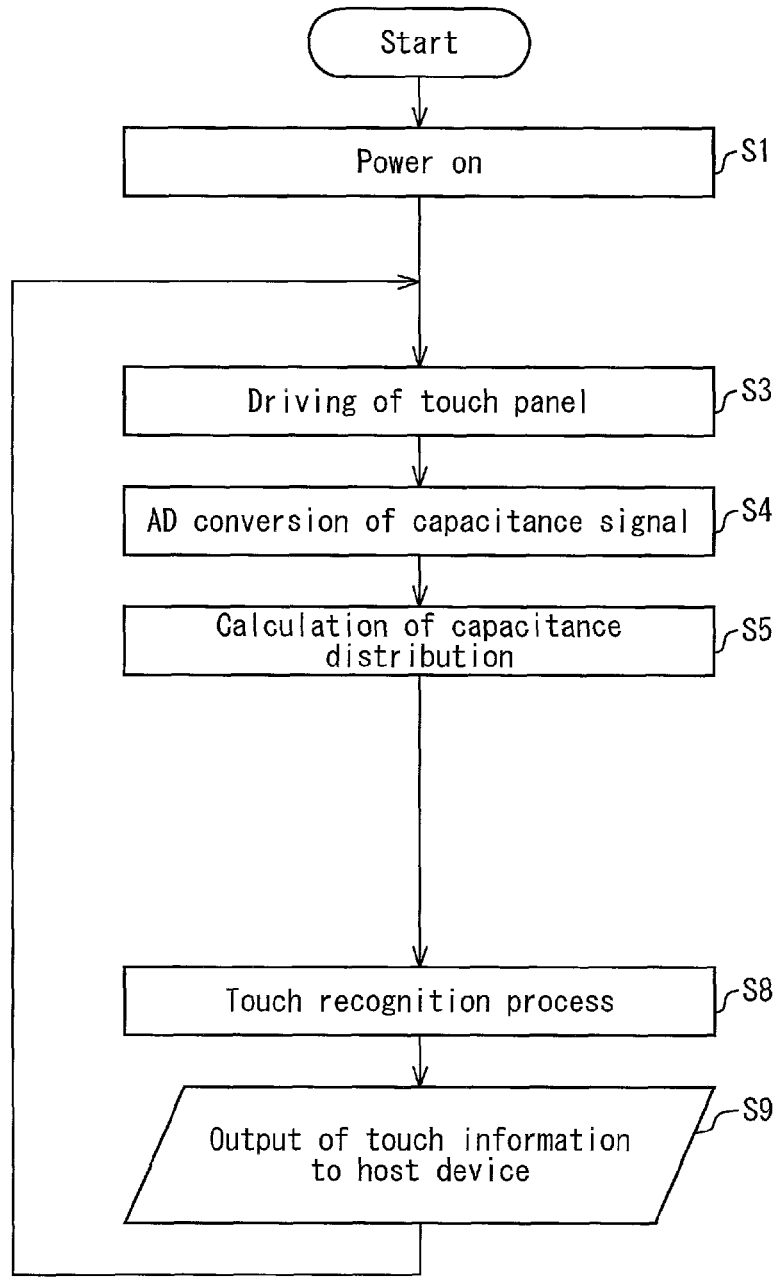

FIG. 7 is a flowchart illustrating an operation of a conventional touch sensor system.

Figure 8:
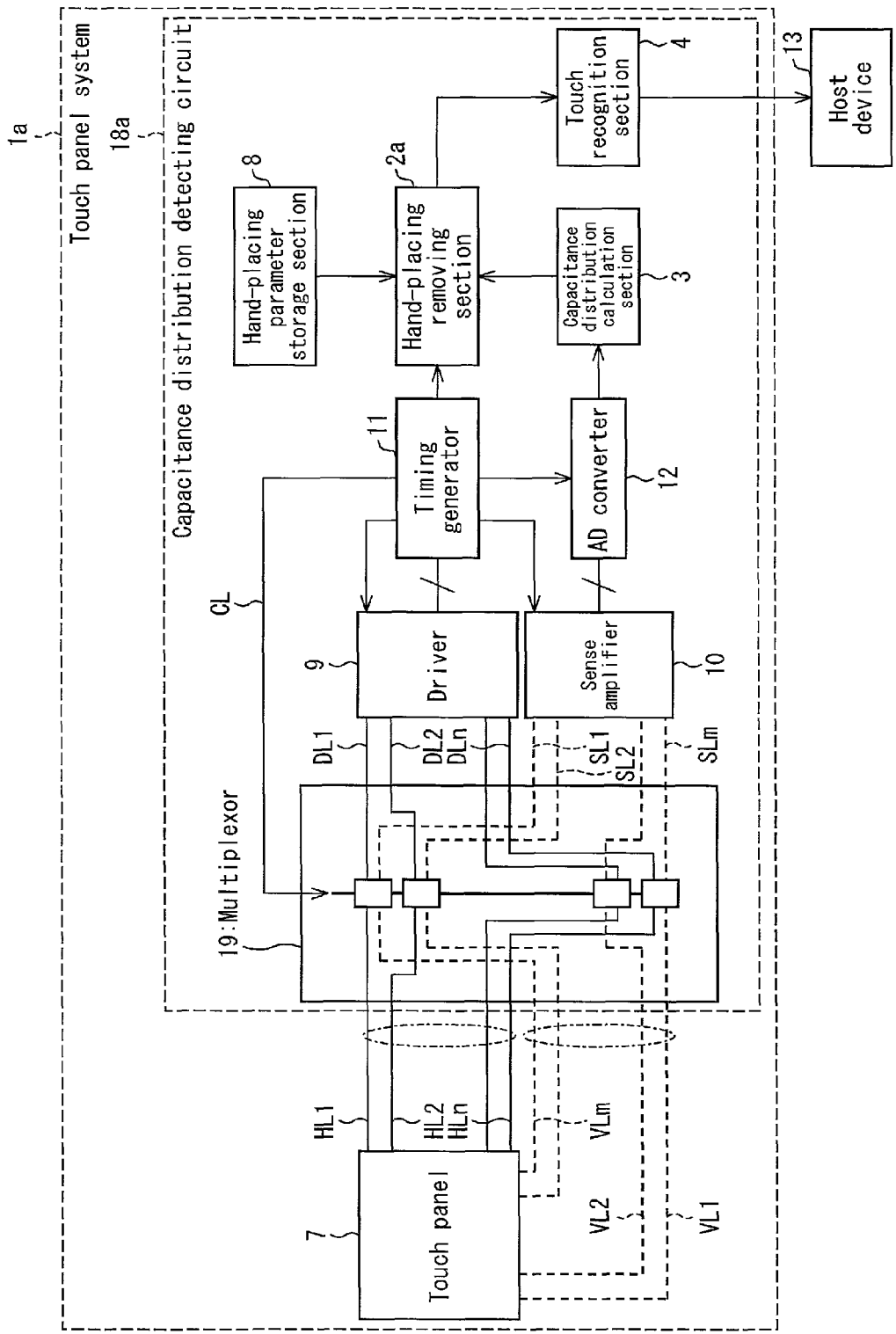

FIG. 8 is a block diagram illustrating a configuration of a touch sensor system in accordance with Second Embodiment.

Figure 9:
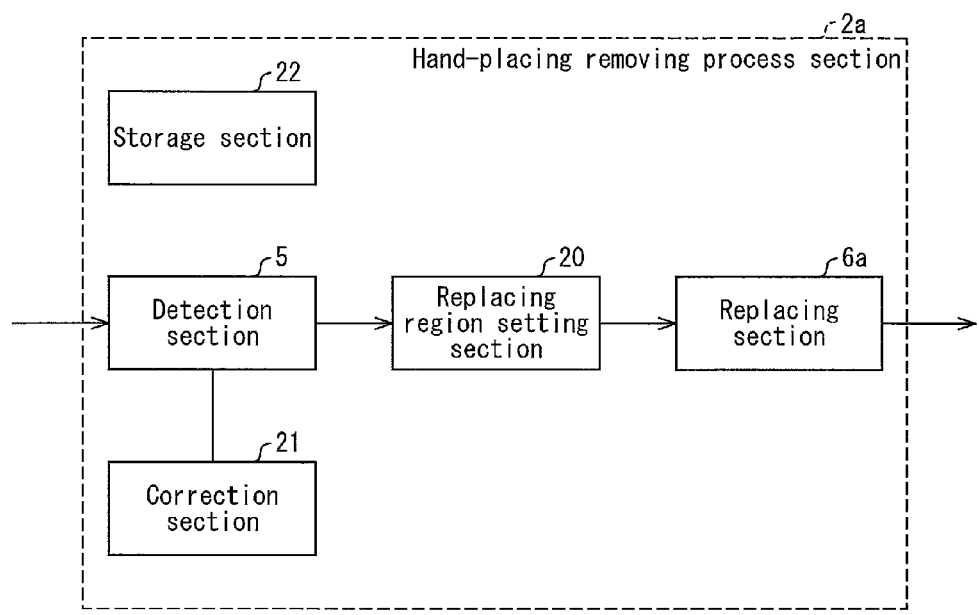

FIG. 9 is a block diagram illustrating a configuration of the hand-placing removing process section provided in the touch sensor system.

Figure 10:
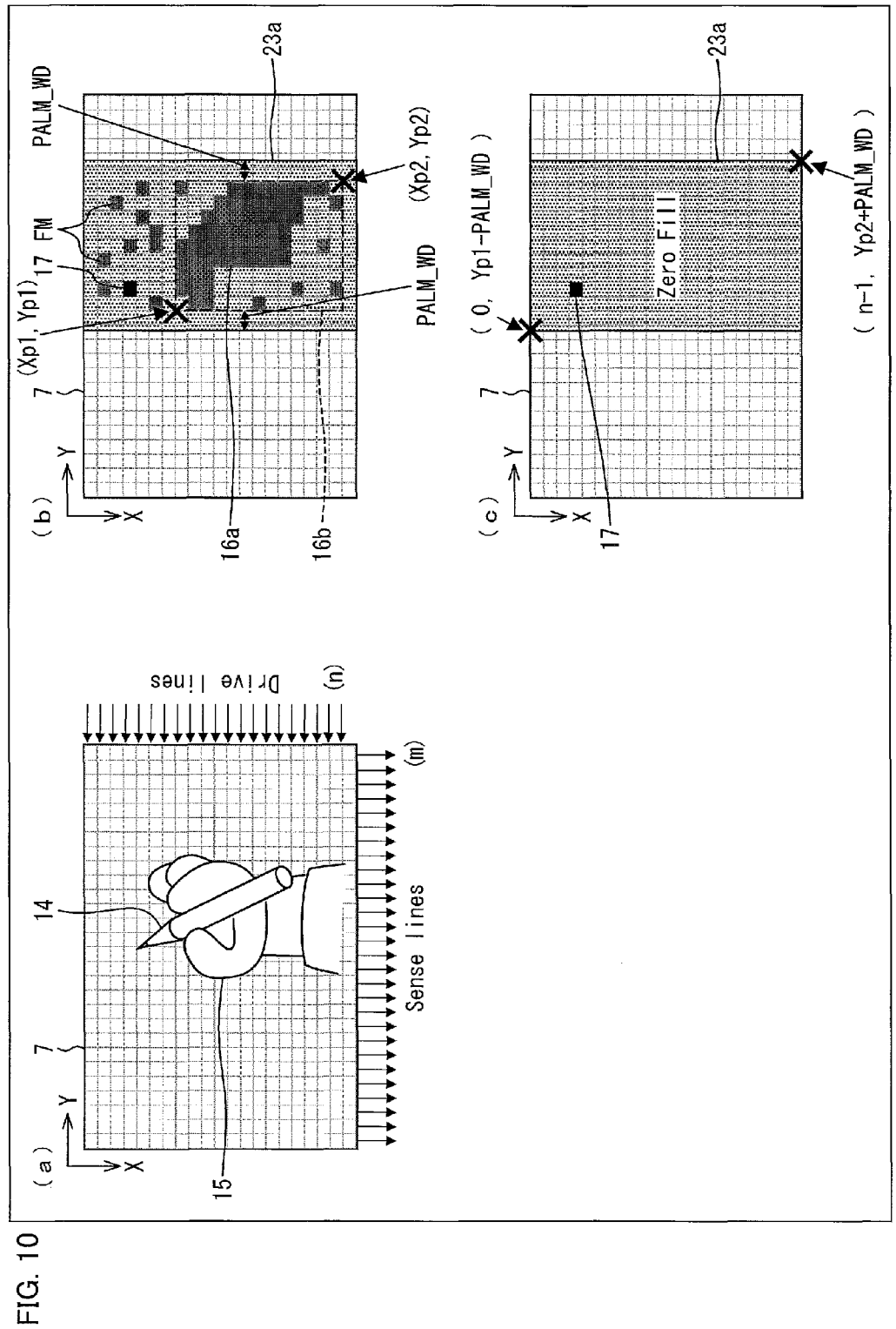

(a) of FIG. 10 to (c) of FIG. 10 are views illustrating a principle of a method for detecting a hand-placing region in the touch sensor system.

Figure 11:
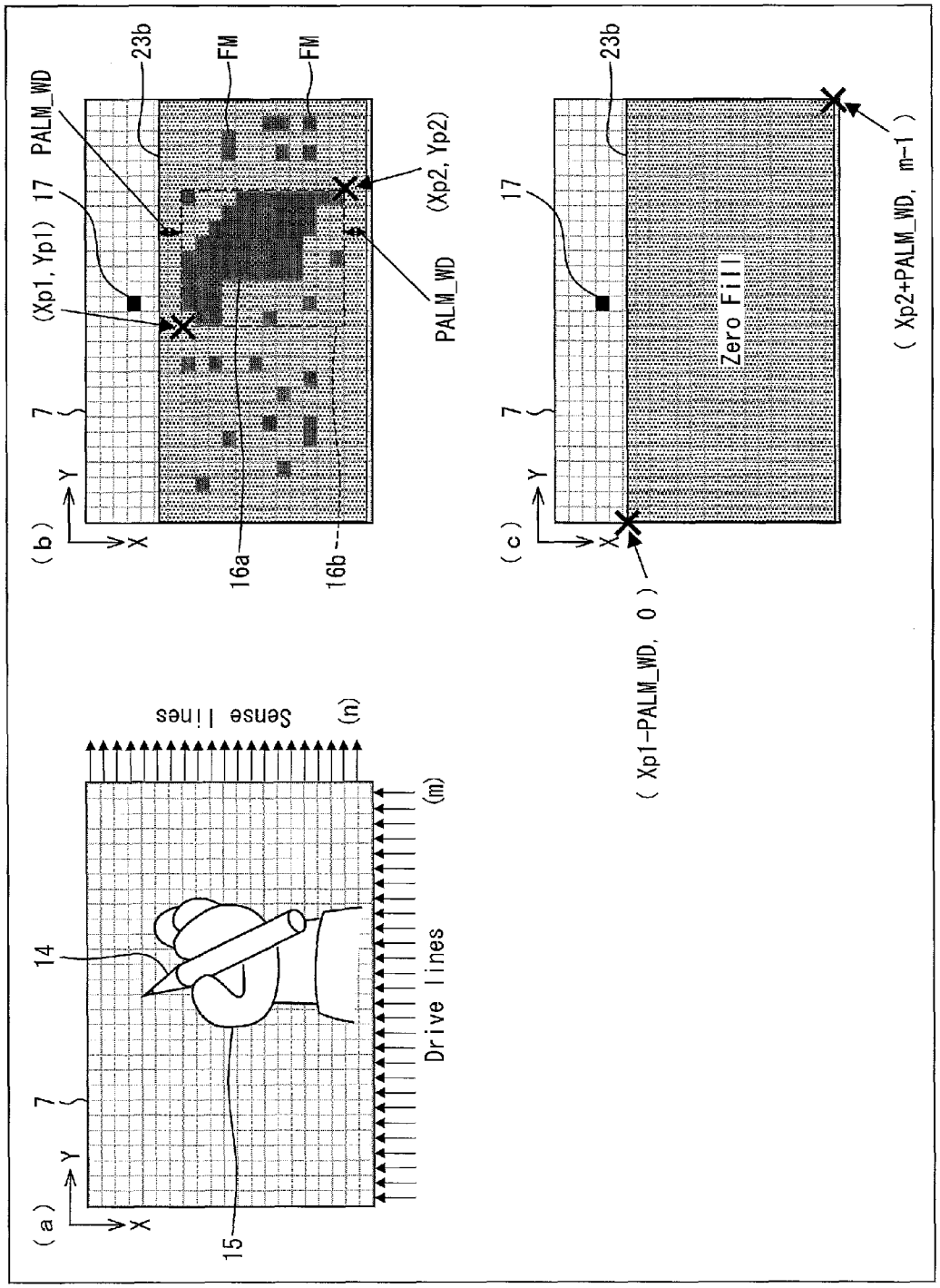

(a) of FIG. 11 to (c) of FIG. 11 are views illustrating a principle of a method for detecting a hand-placing region in the touch sensor system.

Figure 12:
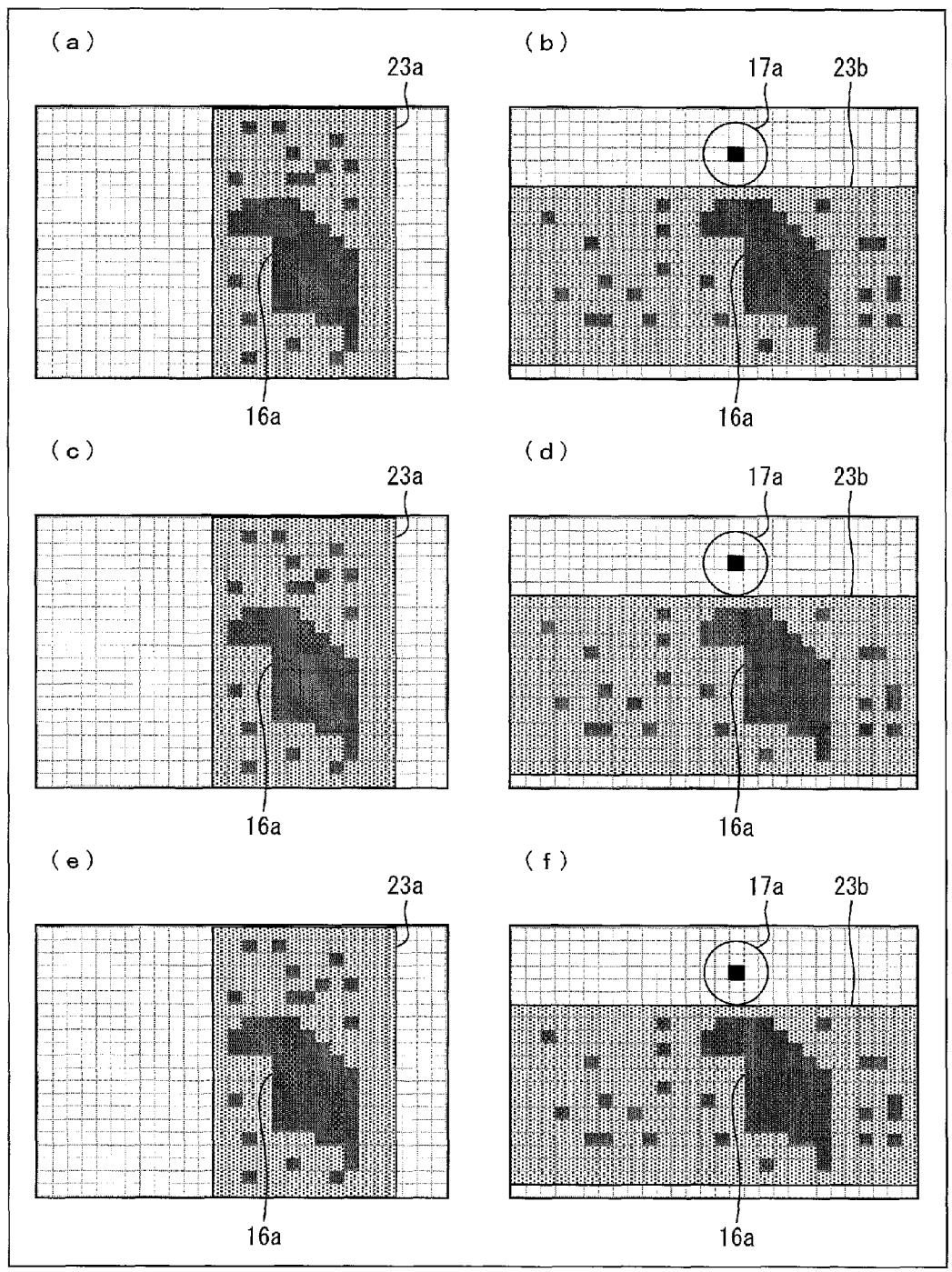

(a) of FIG. 12 to (f) of FIG. 12 are views illustrating a method for detecting a hand-placing region in the touch sensor system.

Figure 13:
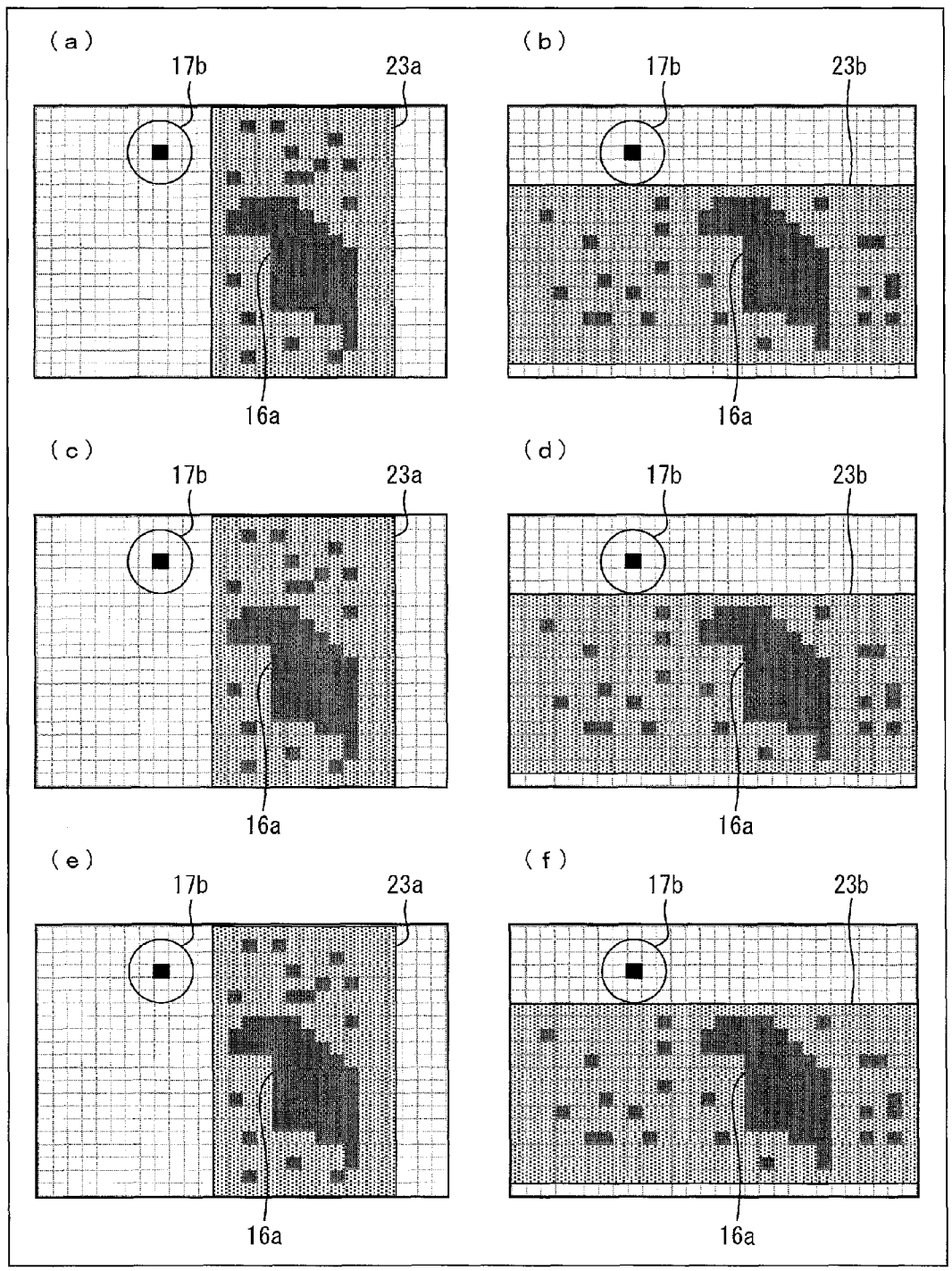

(a) of FIG. 13 to (f) of FIG. 13 are views illustrating a method for detecting a hand-placing region in the touch sensor system.

Figure 14:
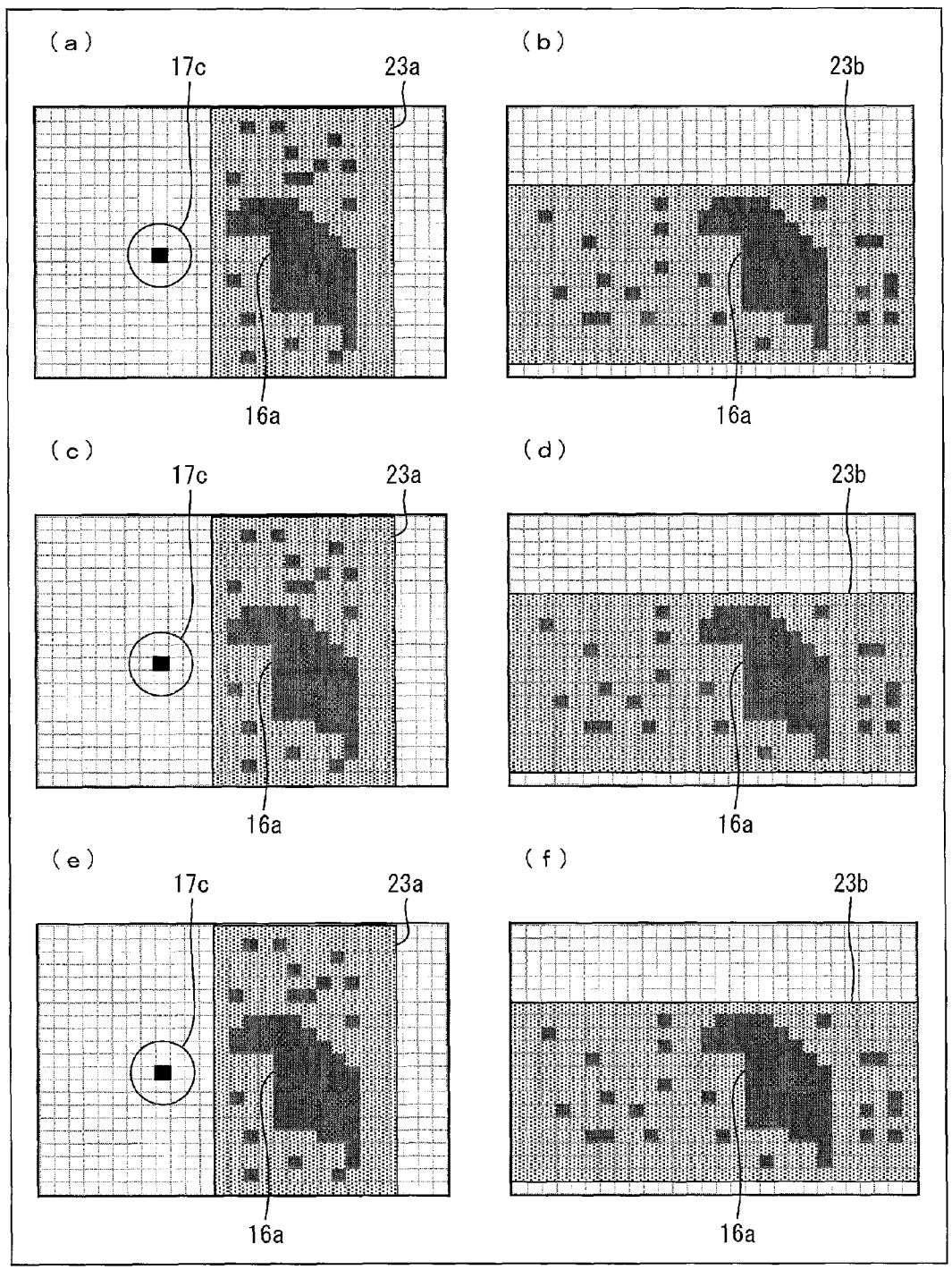

(a) of FIG. 14 to (f) of FIG. 14 are views illustrating a method for detecting a hand-placing region in the touch sensor system.

Figure 15:
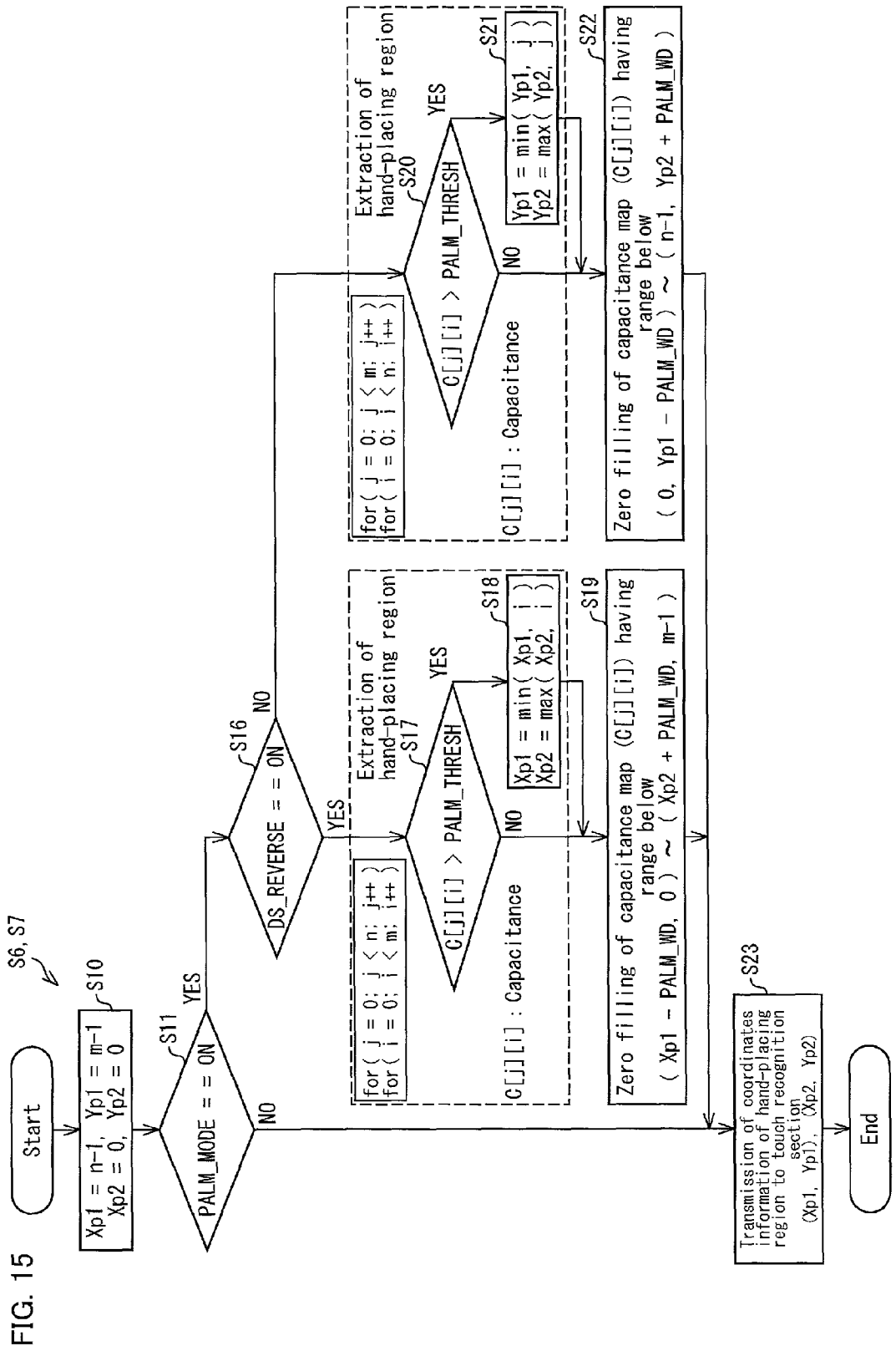

FIG. 15 is a flowchart illustrating an operation of the hand-placing removing process section provided in the touch sensor system.

Figure 16:
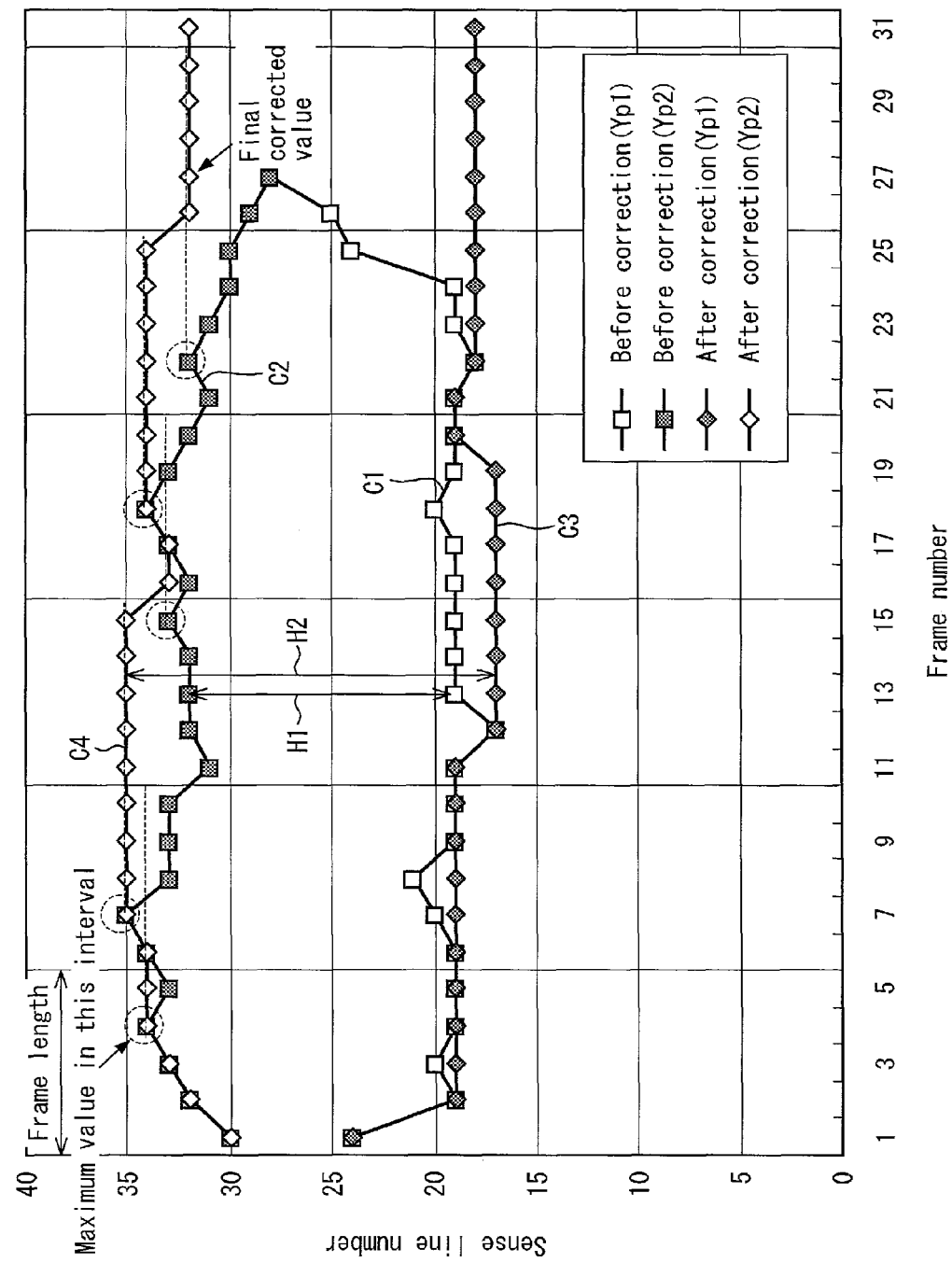

FIG. 16 is a graph illustrating a method for correcting coordinates of a hand-placing region in a touch sensor system in accordance with Third Embodiment.

Figure 17:
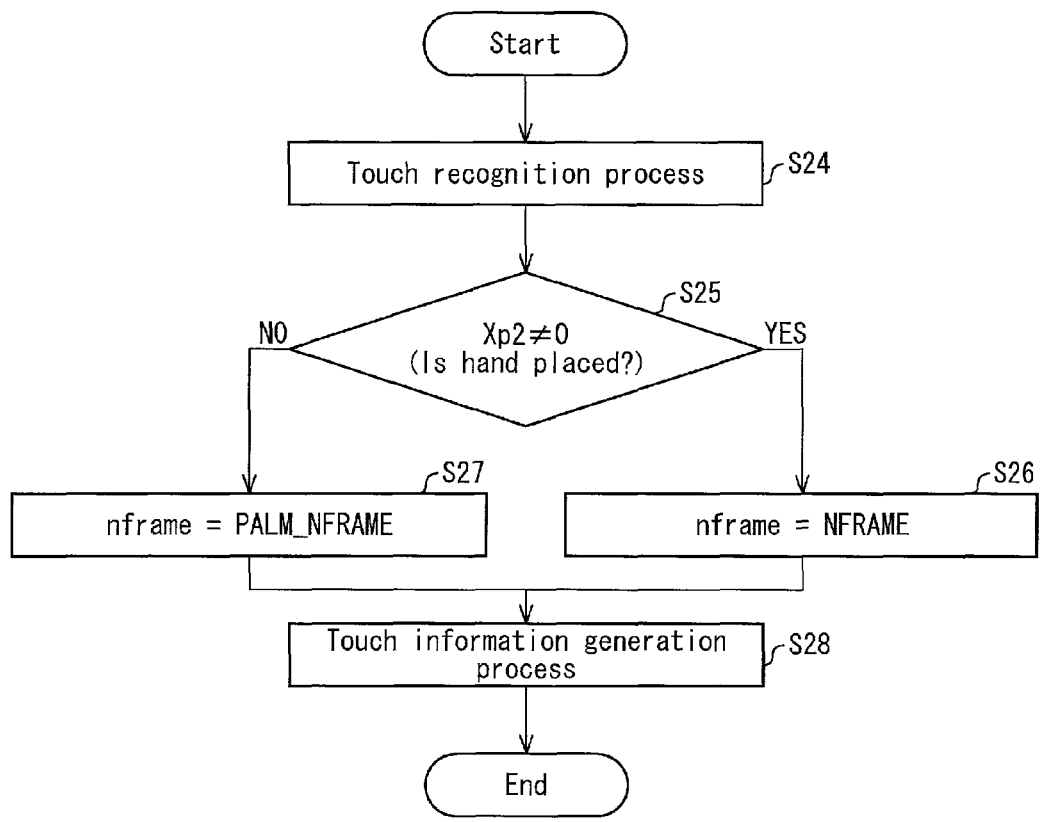

FIG. 17 is a flowchart illustrating a method for changing the number of sequential touches with which number it is determined that a touch is detected in a touch sensor system in accordance with Fourth Embodiment.

Figure 18:
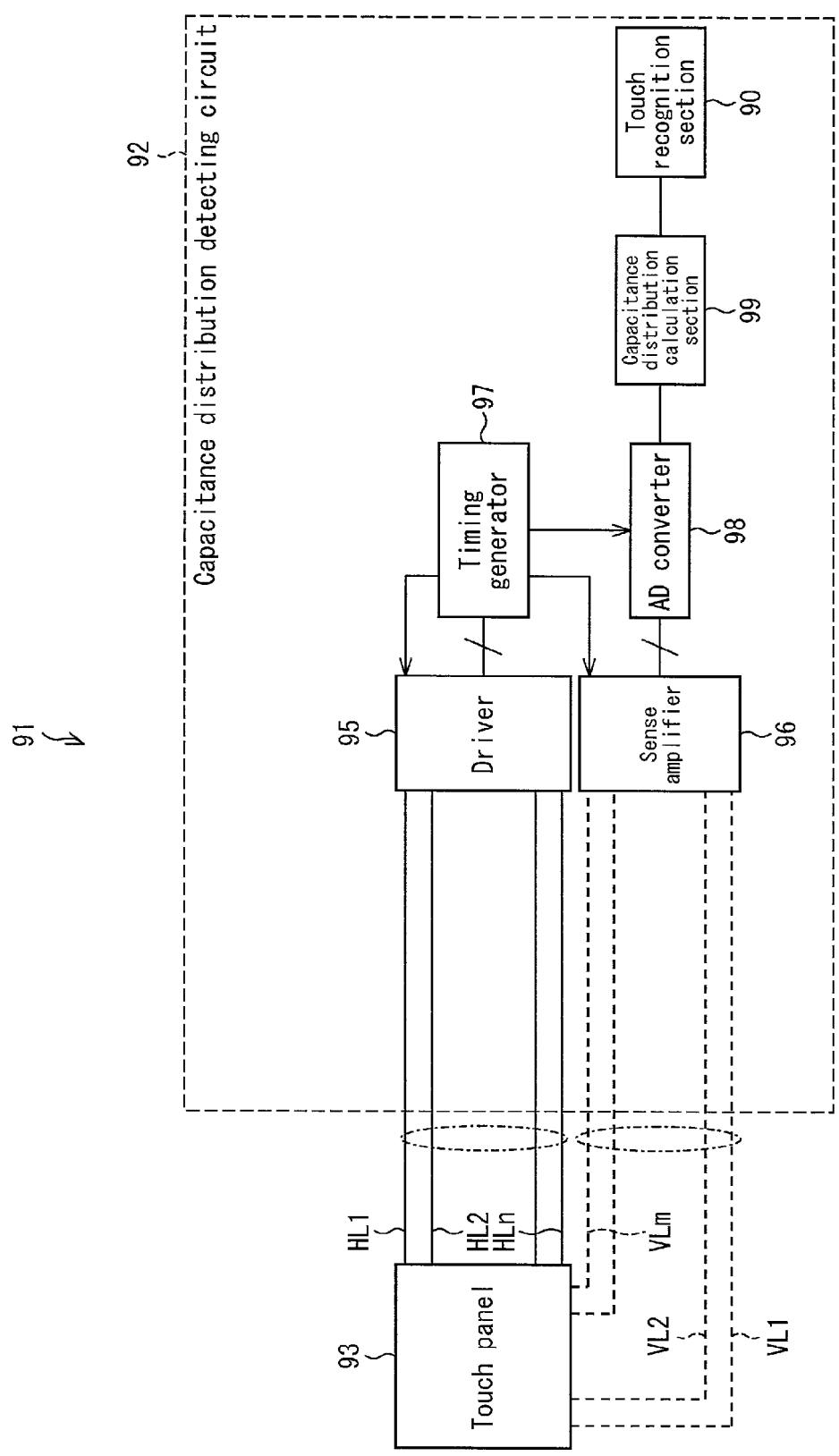

FIG. 18 is a block diagram illustrating a configuration of a conventional touch sensor system.

DESCRIPTION OF EMBODIMENTS

The following description will discuss a touch sensor system in accordance with embodiments of the present invention in detail.

First Embodiment

Configuration of Touch Sensor System 1

Figure 1:
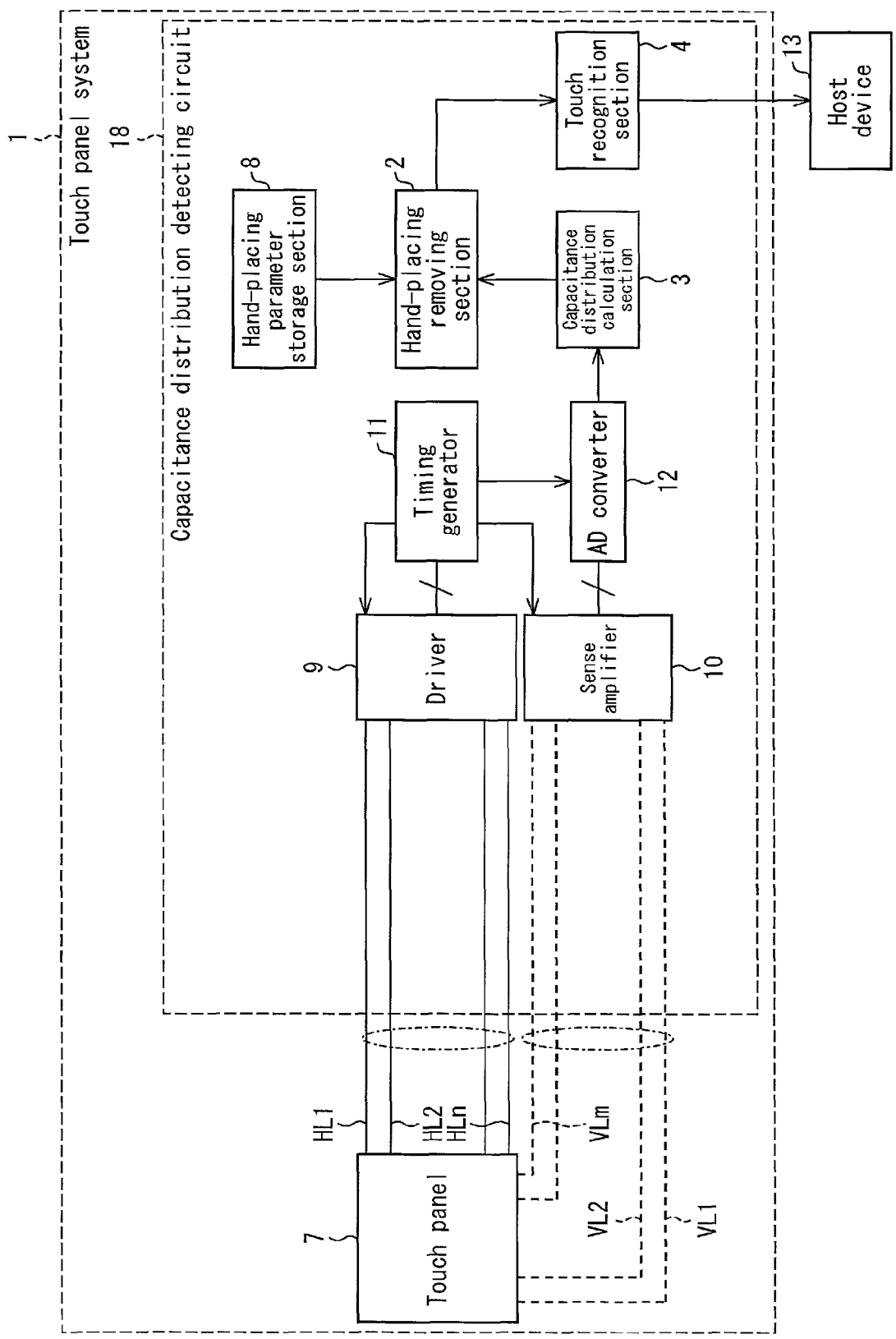
FIG. 1 is a block diagram illustrating a configuration of a touch sensor system in accordance with First Embodiment.

FIG. 1 is a block diagram illustrating a configuration of a touch sensor system 1 in accordance with First Embodiment. The touch sensor system 1 includes a touch panel 7 and a capacitance distribution detecting circuit 18. The touch panel 7 includes drive lines HL1 to HLn provided in parallel with each other in a horizontal direction, sense lines VL1 to VLm provided in parallel with each other in a vertical direction, and a plurality of capacitors respectively provided at intersections of the drive lines HL1 to HLn and the sense lines VL1 to VLm.

The capacitance distribution detecting circuit 18 includes a driver 9. The driver 9 drives capacitors by applying voltages to the drive lines HL1 to HLn in accordance with a code sequence. The capacitance distribution detecting circuit 18 is provided with a sense amplifier 10. The sense amplifier 10 reads out, through the sense lines VL1 to VLm, a linear sum of voltages corresponding to the capacitors driven by the driver 9, and supplies the linear sum to an AD converter 12. The AD converter 12 converts, from analogue to digital, the linear sum and supplies the linear sum thus converted to a capacitance distribution calculation section 3.

The capacitance distribution calculation section 3 calculates distribution of capacitances on the touch panel 7 in accordance with (i) the linear sum of the voltages corresponding to the capacitors, which sum has been supplied from the AD converter 12, and (ii) a code sequence, and supplies the calculated distribution to a hand-placing removing process section 2.

Figure 2:
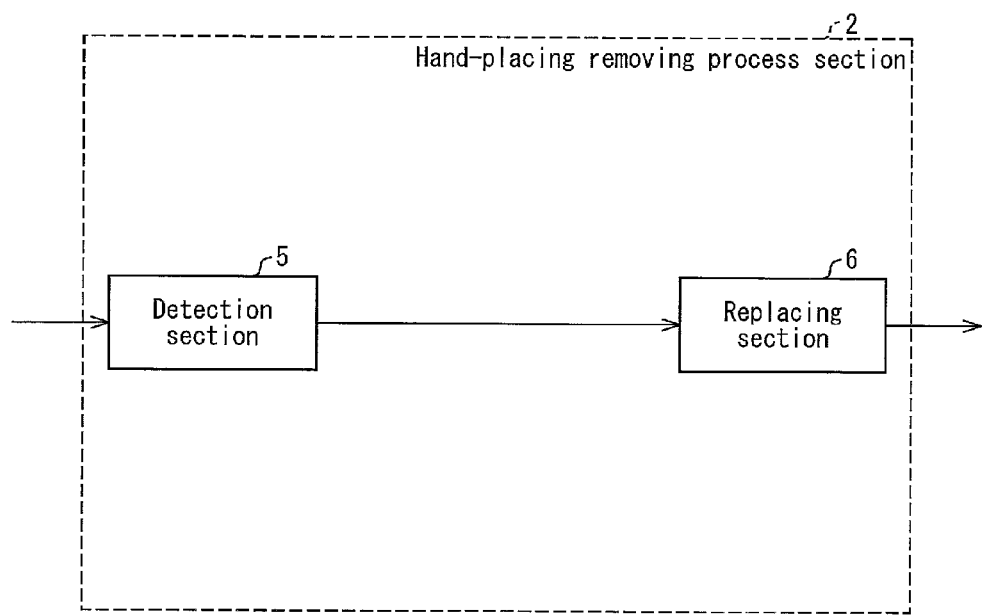
FIG. 2 is a block diagram illustrating a configuration of a hand-placing removing process section provided in the touch sensor system.

FIG. 2 is a block diagram illustrating a configuration of the hand-placing removing process section 2 provided in the touch sensor system 1. The hand-placing removing process section 2 includes a detection section 5 and a replacing section 6. The detection section 5 detects, on a basis of (i) strengths of capacitance signals, each strength being indicative of a change in a corresponding capacitor, and (ii) a parameter stored in a hand-placing parameter storage section 8, a hand-placing region which is a region of the touch panel 7 including a plurality of capacitors provided in a matrix manner and on which region a hand is placed in order to make an input with a stylus to the touch panel 7. The replacing section 6 replaces a value of a capacitance signal corresponding to a capacitor provided in the hand-placing region which value is detected by the detection section 5 with a nil value indicative of a state where no touch input is made, and supplies said nil value to a touch recognition section 4 (FIG. 1).

The touch recognition section 4 outputs, on a basis of (i) the capacitance signal having been replaced with said nil value by the replacing section 6 and (ii) a capacitance signal corresponding to a capacitor provided outside the hand-placing region, coordinates of an input with a stylus to a host device 13 outwardly connected to the touch sensor system 1. The host device 13 carries out a process using application software on a basis of the coordinates of an input with a stylus which have been supplied from the touch recognition section 4.

The capacitance distribution detecting circuit 18 includes a timing generator 11. The timing generator 11 generates a signal for specifying an operation of the driver 9, a signal for specifying an operation of the sense amplifier 10, and a signal for specifying an operation of the AD converter 12, and supplies the signals to the driver 9, the sense amplifier 10, and the AD converter 12, respectively.

(How to Detect Hand-Placing Region)

(a) of FIG. 3 to (c) of FIG. 3 are views illustrating how to detect a hand-placing region in the touch sensor system 1. (a) of FIG. 3 schematically illustrates a state where a user writes a character with a stylus 14 on the touch panel 7 including n drive lines and m sense lines while placing a hand 15 on the touch panel 7. (b) of FIG. 3 illustrates a capacitance distribution map in the state illustrated in (a) of FIG. 3. The capacitance distribution map is generated by the capacitance distribution calculation section 3 illustrated in FIG. 1.

In First Embodiment, when the capacitance distribution calculation section 3 generates the capacitance distribution map, the hand-placing removing process section 2 observes capacitances (capacitance signals) of individual coordinates on the capacitance distribution map and finds a region whose capacitance exceeds a certain threshold "PALM_THRESH", thereby extracting a hand-placing region 16a. In (b) of FIG. 3, coordinates (Xp1, Yp1) at the upper left end of the extracted hand-placing region 16a and coordinates (Xp2, Yp2) at the lower right end of the extracted hand-placing region 16a are obtained to form a first rectangle 16b, which is then enlarged outward by a parameter PALM_WD stored in a hand-placing parameter storage section 8 (FIG. 1) so as to form a second rectangle called a replacing region 23.

(c) of FIG. 3 illustrates a result of replacement of capacitances in the replacing region 23 extracted by the hand-placing removing process section 2 with zero (this replacement is hereinafter also referred to as "zero fill"). The map of distribution of capacitances thus zero-filled is transmitted to the touch recognition section 4 in a subsequent stage. A series of these processes are performed with respect to each frame.

FIG. 4 is a view illustrating automatic movement of the hand-placing region. The rectangular replacing region 23 which is zero-filled on the capacitance distribution map inputted to the touch recognition section 4 (FIG. 1) automatically follows movement of the position of the hand 15 placed on the touch panel 7 while holding a stylus 14.

(Operation of Touch Sensor System 1)

FIG. 5 is a flowchart illustrating an operation of the touch sensor system 1. Initially, the power of the touch panel system 1 illustrated in FIG. 1 is turned on (step S1). Then, parameters stored in the hand-placing parameter storage section 8 provided in the capacitance distribution detecting circuit 18 of the touch panel system 1 are initialized (step S2). Next, the driver 9 drives the touch panel 7 (step S3). Thereafter, a capacitance signal read out by the sense amplifier 10 from the touch panel 7 is converted by the AD converter 12 from analogue to digital (step S4).

Then, the capacitance distribution calculation section 3 calculates distribution of capacitances on the touch panel 7 in accordance with the capacitance signal converted from analogue to digital by the AD converter 12 (step S5). Next, the hand-placing removing process section 2 calculates a hand-placing region in accordance with the distribution of capacitances on the touch panel 7 which distribution has been calculated by the capacitance distribution calculation section 3 (step S6). Thereafter, the hand-placing removing process section 2 sets a replacing region on a basis of the calculated hand-placing region, and replaces capacitances in the replacing region with zero (step S7).

Then, the touch recognition section 4 obtains coordinates of an input with a stylus on a basis of the distribution of capacitances on the touch panel 7 in which capacitances in the replacing region are replaced with zero (step S8). Then, the touch recognition section 4 outputs coordinates of the input with a stylus to the host device 13 (step S9). Then, the process goes back to the step S3.

FIG. 6 is a flowchart illustrating an operation of the hand-placing removing process section 2 provided in the touch sensor system 1. This flowchart details the steps S6 and S7 of FIG. 5, and describes the configuration explained with reference to FIG. 3.

Herein, it is assumed as follows.

m: number of sense lines
n: number of drive lines
PALM_MODE: hand-placing stylus mode flag, 1 for ON, 0 for OFF
PALM_THRESH: threshold with which it is determined whether a hand is placed on a touch panel or not Initially, the detection section 5 provided in the hand-placing removing process section 2 initializes the coordinates stored in the hand-placing parameter storage section 8 such that $Xp1=n-1$, $Yp1=m-1$, $Xp2=0$, and $Yp2=0$ (step S10). Then, the detection section 5 determines whether the variable PALM_MODE is in an on-state or not (step S11).

In a case where it is determined that the variable PALM_MODE is in an on-state (Yes in step S11), it is determined whether a capacitance $C[j][i]$ is larger than the threshold PALM_THRESH or not (step S12). In a case where it is determined that the capacitance $C[j][i]$ is larger than the threshold PALM_THRESH (Yes in step S12), the minimum value of Xp1 and i is substituted for Xp1, and the minimum value of Yp1 and j is substituted for Yp1. Next, the maximum value of Xp2 and i is substituted for Xp2, and the maximum value of Yp2 and j is substituted for Yp2 (step S13). The processes of the steps S12 and S13 are performed with respect to each of capacitors of n rows and m columns.

Thereafter, the replacing section 6 replaces the capacitance C[j][i] in the replacing region 23 specified by two points (Xp1−PALM_WD, Yp1−PALM_WD) and (Xp2+PALM_WD, Yp2+PALM_WD) with zero (step S14).

In a case where it is determined that the variable PALM_MODE is not on (No in step S11), or in a case where the step S14 is carried out, the hand-placing removing process section 2 transmits coordinates information of the replacing region 23 (FIG. 3) to the touch recognition section 4 (step S15).

The variable PALM_MODE is a flag for indicating whether the touch sensor system 1 is in the hand-placing mode or not, and is stored in the hand-placing parameter storage section 8. In a case where PALM_MODE is in an on-state, the process corresponding to hand-placing, which is shown in the steps S12 to S14, is carried out.

An algorithm illustrated in FIG. 6 indicates the process described with reference to FIG. 3. This algorithm is provided in order that the hand-placing removing section 2 can easily carry out the process, and the hand-placing region is not necessarily extracted as a rectangle and the zero-fill region is not necessarily set as a rectangle, and the hand-placing region and the zero-fill region may have any shape.

The replacing region 23 is not necessarily set to be replaced with zero for the touch recognition section 4. The replacement may be made in any manner as long as the manner allows setting a hand-placing region as a region which is not detected in touch recognition, and the replacing region 23 may be replaced with a nil value indicative of a state where no touch input is made.

In the present embodiment, the parameter PALM_WD for expanding the hand-placing region 16b has the same value in four directions. However, the present invention is not limited to this case, and the parameter PALM_WD may have independent values in four directions, respectively.

FIG. 7 is a flowchart illustrating an operation of a conventional touch sensor system 91 illustrated in FIG. 18. Initially, the power of the touch panel system 91 is turned on (step S1). Then, the driver 95 drives the touch panel 93 (step S3). Thereafter, a capacitance signal read out by the sense amplifier 96 from the touch panel 93 is converted by the AD converter 98 from analogue to digital (step S4).

Then, the capacitance distribution calculation section 99 calculates distribution of capacitances on the touch panel 93 in accordance with the capacitance signal converted by the AD converter 98 from analogue to digital (step S5).

Then, the touch recognition section 90 obtains coordinates of an input with a stylus on a basis of the distribution of capacitances on the touch panel 93 (step S8). Next, the touch recognition section 4 outputs coordinates of the input with a stylus to the host device (step S9). Then, the process goes back to the step S3.

As described above, the touch sensor system in accordance with First Embodiment is configured such that the process for calculating the hand-placing region (step S6) and the process for setting the replacing region (step S7) are carried out in the touch sensor system independently of the host device. Consequently, it is unnecessary to specialize application software on the host device to have a function of displaying and moving the hand-placing region and it is possible to mount normal application software on the host device so as to remove a signal generated by a hand placed on the hand-placing region and to detect a signal based on an input with a stylus without wrong recognition.

Second Embodiment

Configuration of Touch Sensor System 1a

FIG. 8 is a block diagram illustrating a configuration of a touch sensor system 1a in accordance with Second Embodiment. Components which are the same as those explained above are given the same reference signs and detailed explanations thereof are omitted.

The touch sensor system 1a includes a touch panel 7 and a capacitance distribution detecting circuit 18a. The touch panel 7 includes signal lines HL1 to HLn provided in parallel with each other in a horizontal direction, signal lines VL1 to VLm provided in parallel with each other in a vertical direction, and a plurality of capacitors respectively provided at intersections of the signal lines HL1 to HLn and the signal lines VL1 to VLm. The touch panel 7 preferably has a sufficient area which allows a hand holding a stylus to be placed on the area. Alternatively, the touch panel 7 may have a size suitable for use in smart phones.

The capacitance distribution detecting circuit 18a includes a driver 9. The driver 9 applies voltages to drive lines DL1 to DLn in accordance with a code sequence. The capacitance distribution detecting circuit 18a is provided with a sense amplifier 10. The sense amplifier 10 reads out, through sense lines SL1 to SLm, a linear sum of potentials corresponding to the capacitors, and supplies the linear sum to an AD converter 12.

The capacitance distribution detecting circuit 18a includes a multiplexor 19. The multiplexor 19 switches between (i) a first connection state where the signal lines HL1 to HLn are respectively connected with the drive lines DL1 to DLn of the driver 9 and the signal lines VL1 to VLm are respectively connected with the sense lines SL1 to SLm of the sense amplifier 10 and (ii) a second connection state where the signal lines HL1 to HLn are respectively connected with the sense lines SL1 to SLm of the sense amplifier 10 and the signal lines VL1 to VLm are respectively connected with the drive lines DL1 to DLn of the driver 9.

When a signal of a control line CL is Low, the signal lines HL1 to HLm are respectively connected with the drive lines DL1 to DLn, and the signal lines VL1 to VLm are respectively connected with the sense lines SL1 to SLm. When the signal of the control line CL is High, the signal lines HL1 to HLn are respectively connected with the sense lines SL1 to SLm and the signal lines VL1 to VLm are respectively connected with the drive lines DL1 to DLn.

The AD converter 12 converts, from analogue to digital, the linear sum of potentials corresponding to the capacitors, which sum has been read out through the sense lines SL1 to SLm, and supplies the linear sum thus converted to a capacitance distribution calculation section 3.

The capacitance distribution calculation section 3 calculates distribution of capacitances on the touch panel 3 in accordance with (i) the linear sum of the potentials corresponding to the capacitors, which sum has been supplied from the AD converter 12, and (ii) a code sequence, and supplies the calculated distribution to a hand-placing removing process section 2a.

FIG. 9 is a block diagram illustrating a configuration of the hand-placing removing process section 2a provided in the touch sensor system 1a. The hand-placing removing process section 2a includes a detection section 5. The detection section 5 detects, on a basis of strengths of capacitance signals, each strength being indicative of a change in a corresponding capacitor, a hand-placing region which is a region of the touch panel 7 including a plurality of capacitors provided in a matrix manner and on which region a hand is placed in order to make an input with a stylus to the touch panel 7.

The hand-placing removing process section 2a includes a replacing-region setting section 20. The replacing-region setting section 20 sets, in accordance with the hand-placing region detected by the detecting section 5, a replacing region where a value of a capacitance signal is replaced with a nil value indicative of a state where no touch input is made.

The replacing region includes a horizontal region which includes the hand-replacing region and which extends in a horizontal direction, and a vertical region which includes the hand-replacing region and which extends in a vertical direction. The replacing-region setting section 20 switches the replacing region between the horizontal region and the vertical region with respect to each frame during which a capacitance signal is read out from the touch panel 7.

The hand-placing removing process section 2a includes a replacing section 6a. The replacing section 6a replaces values of capacitance signals, which correspond to capacitors provided in the horizontal region and the vertical region which are switchable by the replacing-region setting section 20, with a nil value indicative of a state where no touch input is made, and supplies the replaced values to the touch recognition section 4. In the storage section 22, a parameter to be used in a process carried out by the hand-placing removing process section 2a is stored. The correction section 21 will be described later in Third Embodiment.

The touch recognition section 4 outputs, to the host device 13 outwardly connected to the touch sensor system 1, coordinates of an input with a stylus per frame on a basis of (i) the capacitance signals replaced with a nil value by the replacing section 6a and (ii) the capacitance signals corresponding to capacitors provided outside the hand-placing region. The host device 13 carries out a process using application software on a basis of the coordinates of the input with a stylus which coordinates have been supplied from the touch recognition section 4.

The capacitance distribution detecting circuit 18a includes a timing generator 11. The timing generator 11 generates a signal for specifying an operation of the driver 9, a signal for specifying an operation of the sense amplifier 10, and a signal for specifying an operation of the AD converter 12, and supplies the signals to the driver 9, the sense amplifier 10, and the AD converter 12, respectively.

This system configuration is intended for realizing a hand-placing removing process in a case where an electromagnetic noise which a user's body has received from a surrounding space enters the touch panel via a user's hand, finger etc. and the noise is overlapped with a signal flowing in a sense line touched by the hand, finger etc. to be a phantom noise which is a false signal.

The hand-placing removing process section 2a extracts, from a capacitance distribution map, a region whose capacitance exceeds a certain threshold in accordance with a later-mentioned method, and sets the region as a non-detecting region for the touch recognition section 4. In this process, the hand-placing removing process section 2a refers to a parameter stored in the hand-placing parameter storage section 8.

The touch recognition section 4 recognizes a touch from the capacitance distribution map, and transmits touch information to the host device 13. The host device 13 carries out a process using application software on a basis of the received touch information.

(How to Detect Hand-Placing Region in Touch Sensor System 1a)

(a) of FIG. 10 to (c) of FIG. 10 are views illustrating a principle of a method for detecting a hand-placing region in the touch sensor system 1a. (a) of FIG. 10 schematically illustrates a state where a user writes a character with a stylus 14 on the touch panel 7 having n drive lines and m sense lines while placing a hand 15 on the touch panel 7 in a case where inversion of the drive lines and the sense lines is not performed in the system illustrated in FIG. 8.

(b) of FIG. 10 illustrates a capacitance distribution map in the state illustrated in (a) of FIG. 10. This capacitance distribution map is generated by the capacitance distribution calculation section 3 illustrated in FIG. 8. A phantom noise FM is generated in a direction along the sense lines. In order to remove the phantom noise FM, the replacing section 6a replaces values of capacitance signals corresponding to capacitors provided in the vertical replacing region 23a which includes the hand-placing region 16b and which extends along the sense lines with a nil value (e.g. 0) indicative of a state where not touch input is made (zero fill).

In Second Embodiment, when the capacitance distribution calculation section 3 generates the capacitance distribution map, the hand-placing removing process section 2a observes capacitances of individual coordinates on the capacitance distribution map, finds a region whose capacitance exceeds a certain threshold PALM_THRESH, and extracts the hand-placing region 16a. In (b) of FIG. 10, coordinates (Xp1,Yp1) at the upper left end of the extracted hand-placing region 16a and coordinates (Xp2, Yp2) at the lower right end of the extracted hand-placing region 16a are obtained to form a hand-placing region 16b which is a first rectangle, and the rectangular hand-placing region 16b is expanded in a Y-axis direction by a parameter PALM_WD stored in the hand-placing parameter storage section 8 and expanded in an X-direction to reach both ends of the touch panel 7 to be the vertical replacing region 23a which is a second rectangle.

(c) of FIG. 10 illustrates the result of replacing capacitances in the vertical region 23a which is a second rectangle extracted by the hand-placing removing process section 2a with zero. The capacitance distribution map thus replaced is sent to the touch recognition section 4 in a subsequent stage. A series of these processes are carried out with respect to each frame.

As a result of the above processes, the phantom noise FM due to hand placing is removed. However, as illustrated in (a) of FIG. 10, writing a character with the stylus 14 in a region replaced with zero results in a touch with a stylus in the vertical region 23a, so that the touch recognition section 4 cannot recognize the touch with the stylus.

Information indicating whether the drive lines and the sense lines of the touch panel 7 are inverted or not is transmitted from the timing generator 11 to the hand-placing removing process section 2a.

(a) of FIG. 11 to (c) of FIG. 11 are views illustrating a principle of a method for detecting a hand-placing region in the touch sensor system 1a. (a) of FIG. 11 to (c) of FIG. 11 illustrate a case where inversion of the drive lines and the sense lines is performed, contrary to the case illustrated in (a) of FIG. 10 to (c) of FIG. 10.

(a) of FIG. 11 schematically illustrates a state where a user writes a character with the stylus 14 on the touch panel 7 having m drive lines and n sense lines while placing the hand 15 on the touch panel 7, in a case where inversion of the drive lines and the sense lines is performed in the touch panel system 1a illustrated in FIG. 8.

(b) of FIG. 11 illustrates a capacitance distribution map in the state illustrated in (a) of FIG. 11. This capacitance distribution map is generated by the capacitance distribution calculation section 3 illustrated in FIG. 8. Since the phantom noise FM is generated in a lateral direction along the sense lines, a horizontal region 23*b* extending in the lateral direction along the sense lines is set in order to remove the phantom noise FM.

In Second Embodiment, when the capacitance distribution calculation section 3 generates the capacitance distribution map, the hand-placing removing process section 2*a* observes capacitances of individual coordinates on the capacitance distribution map, finds a region whose capacitance exceeds a certain threshold PALM_THRESH, and extracts the hand-placing region 16*a*. In (b) of FIG. 11, coordinates (Xp1,Yp1) at the upper left end of the extracted hand-placing region 16*a* and coordinates (Xp2, Yp2) at the lower right end of the extracted hand-placing region 16*a* are obtained to form a hand-placing region 16*b* which is a first rectangle, and the rectangular hand-placing region 16*b* is expanded in an X-axis direction by a parameter PALM_WD stored in the hand-placing parameter storage section 8 and expanded in a Y-direction to reach both ends of the touch panel 7 to be the horizontal replacing region 23*b* which is a second rectangle.

(c) of FIG. 11 illustrates the result of replacing capacitances in the horizontal region 23*b*, which is a second rectangle extracted by the hand-placing removing process section 2*a*, with zero (zero fill). The capacitance distribution map thus replaced is sent to the touch recognition section 4 in a subsequent stage. A series of these processes are carried out with respect to each frame.

As a result of the above processes, the phantom noise FM due to hand placing is removed, and a signal caused by the stylus exists outside the region replaced with zero as illustrated in (a) of FIG. 11. Consequently, the touch recognition section 4 can detect a touch with the stylus.

Information indicating whether the drive lines and the sense lines of the touch panel are inverted or not is transmitted from the timing generator 11 to the hand-placing removing process section 2*a*.

(a) of FIG. 12 to (f) of FIG. 12, (a) of FIG. 13 to (f) of FIG. 13, and (a) of FIG. 14 to (f) of FIG. 14 are views illustrating methods for detecting a hand-placing region in the touch sensor system 1*a*.

In (a) of FIG. 12, inversion of the drive lines and the sense lines is not performed, and the vertical region 23*a* is replaced with zero, so that a stylus signal region 17*a* above the hand-placing region 16*a* cannot be detected. Next, in (b) of FIG. 12, the inversion of the drive lines and the sense lines is performed, and the horizontal region 23*b* is replaced with zero, so that the stylus signal region 17*a* above the hand-placing region 16*a* can be detected. Then, in (c) of FIG. 12, the inversion of the drive lines and the sense lines is not performed, and the vertical region 23*a* is replaced with zero, so that the stylus signal region 17*a* cannot be detected. Thereafter, in (d) of FIG. 12, the inversion of the drive lines and the sense lines is performed, and the horizontal region 23*b* is replaced with zero, so that the stylus signal region 17*a* can be detected.

Then, in (e) of FIG. 12, the inversion of the drive lines and the sense lines is not performed, and the vertical region 23*a* is replaced with zero, so that the stylus signal region 17*a* cannot be detected. Thereafter, in (f) of FIG. 12, the inversion of the drive lines and the sense lines is performed, and the horizontal region 23*b* is replaced with zero, so that the stylus signal region 17*a* can be detected.

As described above, in the operation illustrated in (a) of FIG. 12 to (f) of FIG. 12, only when the inversion of the drive lines and the sense lines is performed, the stylus signal 17*a* can be detected.

A description will be provided below as to an operation illustrated in (a) of FIG. 13 to (f) of FIG. 13. In (a) of FIG. 13, inversion of the drive lines and the sense lines is not performed, and the vertical region 23*a* is replaced with zero, so that a stylus signal region 17*b* positioned to the left and above the hand-placing region 16*a* can be detected. Next, in (b) of FIG. 13, the inversion of the drive lines and the sense lines is performed, and the horizontal region 23*b* is replaced with zero, so that the stylus signal region 17*b* positioned to the left and above the hand-placing region 16*a* can be detected. Then, in (c) of FIG. 13, the inversion of the drive lines and the sense lines is not performed, and the vertical region 23*a* is replaced with zero, so that the stylus signal region 17*b* can be detected. Thereafter, in (d) of FIG. 13, the inversion of the drive lines and the sense lines is performed, and the horizontal region 23*b* is replaced with zero, so that the stylus signal region 17*b* can be detected. Then, in (e) of FIG. 13, the inversion of the drive lines and the sense lines is not performed, and the vertical region 23*a* is replaced with zero, so that the stylus signal region 17*b* can be detected. Thereafter, in (f) of FIG. 13, the inversion of the drive lines and the sense lines is performed, and the horizontal region 23*b* is replaced with zero, so that the stylus signal region 17*b* can be detected.

As described above, in the operation illustrated in (a) of FIG. 13 to (f) of FIG. 13, the stylus signal 17*b* can be detected both when the inversion of the drive lines and the sense lines is performed and when the inversion is not performed.

A description will be provided below as to an operation illustrated in (a) of FIG. 14 to (f) of FIG. 14. Initially, in (a) of FIG. 14, inversion of the drive lines and the sense lines is not performed, and the vertical region 23*a* is replaced with zero, so that a stylus signal region 17*c* at the left of the hand-placing region 16*a* can be detected. Next, in (b) of FIG. 14, the inversion of the drive lines and the sense lines is performed, and the horizontal region 23*b* is replaced with zero, so that the stylus signal region 17*c* at the left of the hand-placing region 16*a* cannot be detected. Then, in (c) of FIG. 14, the inversion of the drive lines and the sense lines is not performed, and the vertical region 23*a* is replaced with zero, so that the stylus signal region 17*c* can be detected. Thereafter, in (d) of FIG. 14, the inversion of the drive lines and the sense lines is performed, and the horizontal region 23*b* is replaced with zero, so that the stylus signal region 17*c* cannot be detected. Then, in (e) of FIG. 14, the inversion of the drive lines and the sense lines is not performed, and the vertical region 23*a* is replaced with zero, so that the stylus signal region 17*c* can be detected. Thereafter, in (f) of FIG. 14, the inversion of the drive lines and the sense lines is performed, and the horizontal region 23*b* is replaced with zero, so that the stylus signal region 17*c* cannot be detected.

As described above, in the operation illustrated in (a) of FIG. 14 to (f) of FIG. 14, only when the inversion of the drive lines and the sense lines is not performed, the stylus signal 17*c* can be detected.

As described above, by switching the drive lines and the sensor lines per frame so that the replacing region is switched between two directions: the vertical region 23*a* and the horizontal region 23*b*, it is possible for the touch recognition section 4 in a subsequent stage to recognize an input signal with a stylus in at least one series of the frames.

(Operation of Touch Sensor System 1*a*)

FIG. 15 is a flowchart illustrating an operation of a hand-placing removing process section 2*a* provided in the touch sensor system 1*a*.

Herein, it is assumed as follows.

m: number of sense lines (when inversion of drive lines and sense lines is not performed)

n: number of drive lines (when inversion of drive lines and sense lines is not performed)

PALM_MODE: hand-placing stylus mode flag, 1 for ON, 0 for OFF

PALM_THRESH: threshold with which it is determined whether a hand is placed on a touch panel or not DS_REVERSE: drive-sense inversion flag which is a parameter supplied from a timing generator so as to determine whether to perform inversion of drive lines and sense lines, 1 for ON, 0 for OFF Initially, the detection section 5 provided in the hand-placing removing process section 2a initializes the coordinates stored in the hand-placing parameter storage section 8 such that Xp1=n−1, Yp1=m−1, Xp2=0, and Yp2=0 (step S10). Then, the detection section 5 determines whether the variable PALM_MODE is in an on-state or not (step S11).

In a case where it is determined that the variable PALM_MODE is in an on-state (Yes in step S11), it is determined whether the variable DS_REVERSE is in an on-state or not (step S16). In a case where it is determined that the variable DS_REVERSE is in an on-state (Yes in step S16), it is determined whether a capacitance C[j][i] of the touch panel 7 is larger than the threshold PALM_THRESH or not (step S17). In a case where it is determined that the capacitance C[j][i] is larger than the threshold PALM_THRESH (Yes in step S17), a smaller one of Xp1 and i is substituted for Xp1, and a larger one of Xp2 and i is substituted for XP2 (step S18). The processes of the steps S17 and S18 are performed with respect to each of capacitors of n rows and m columns.

Next, the replacing section 6a replaces the capacitance C[j][i] in the vertical region 23a specified by two points (Xp1−PALM_WD, 0) and (Xp2+PALM_WD, m−1) with zero (step S19).

In a case where it is determined that the variable DS_REVERSE is not on (No in step S16), it is determined whether the capacitance C[j][i] of the touch panel 7 is larger than the threshold PALM_THRESH or not (step S20). In a case where it is determined that the capacitance C[j][i] is larger than the threshold PALM_THRESH (Yes in step S20), a smaller one of Yp1 and j is substituted for Yp1, and a larger one of Yp2 and j is substituted for Yp2 (step S21). The processes of the steps S20 and S21 are performed with respect to each of capacitors of n rows and m columns.

Next, the replacing section 6a replaces the capacitance C[j][i] in the horizontal region 23b specified by two points (0, Yp1-PALM_WD) and (n−1, Yp2+PALM_WD) with zero (step S22).

In a case where it is determined that the variable PALM_MODE is not on (No in step S11), or in a case where the step S19 or the step S22 is carried out, the hand-placing removing process section 2a transmits coordinates information of the vertical region 23 or the horizontal region 23b to the touch recognition section 4 (step S23).

FIG. 15 is a flowchart illustrating the configuration explained above with reference to FIGS. 10 and 11. The variable PALM_MODE is a flag for indicating whether the touch sensor system 1a is in the hand-placing mode or not, and is stored in the hand-placing parameter storage section 8. In a case where the variable PALM_MODE is in an on-state, the process corresponding to hand-placing, which is shown in the steps S16 to S22, is carried out.

An algorithm illustrated in FIG. 15 indicates the process described with reference to FIGS. 10 and 11. This algorithm is provided in order that the hand-placing removing section 2a can easily carry out the process, and the extracted hand-placing regions 16a and 16b and the set vertical region 23a and the set horizontal region 23b are not necessarily rectangular and may have any shape.

The vertical region 23a and the horizontal region 23b are not necessarily set to be replaced with zero for the touch recognition section 4. The replacement may be made in any manner as long as the manner allows setting the vertical region 23a and the horizontal region 23b as regions which are not detected in touch recognition, and the vertical region 23a and the horizontal region 23b may be replaced with a nil value indicative of a state where no touch input is made.

In the present embodiment, the parameter PALM_WD for expanding the hand-placing region 16b has the same value in two directions. However, the present invention is not limited to this case, and the parameter PALM_WD may have independent values in two directions, respectively.

Third Embodiment

Method for Correcting Coordinates of Hand-Placing Region

FIG. 16 is a graph illustrating a method for correcting coordinates of a hand-placing region in accordance with Third Embodiment. Detection of a hand-placing region with hysteresis allows correcting boundaries of the detected hand-placing region.

In the methods for removing hand-placing in accordance with First and Second Embodiments, the hand-placing removing process section 2 extracts a hand-placing region per frame, and in accordance with the result of the extraction, replaces values of capacitance signals in the hand-placing region with a nil value indicative of a state where no touch input is made, thereby setting a non-detection region.

However, this method requires scanning a whole of a capacitance distribution map and extracting a hand-placing region before the touch recognition section 4 setting a non-detection region with respect to the whole of the capacitance distribution map.

For this purpose, it is necessary to carry out a process such as extracting a hand-placing region while causing a capacitance distribution map per frame to be stored in a frame memory etc. and setting a non-detection region when reading out the stored capacitance distribution map and transmitting it to the touch recognition section 4.

In contrast, a configuration in which a hand-placing region is extracted from a capacitance distribution map in a certain frame and a non-detection region is set for a capacitance distribution map in a next frame in accordance with the result of the extraction makes it unnecessary to use a frame memory, thereby avoiding an increase in costs.

However, in a case where the result of extraction of a hand-placing region in a previous frame is caused to be reflected in a next frame, when a hand-placing position moves or when an area where a hand placed on a touch panel surface contacts the touch panel surface changes, there is a possibility that the extracted hand-placing region greatly changes. Consequently, there is a possibility that a hand-placing position appears outside a non-detection region set in a next frame (the non-detection region is set according to a hand-placing state in the previous frame), which may result in misrecognition that the hand-placing is an effective touch. In order to avoid such misrecognition, it is effective to employ a configuration in which a result of extraction of a hand-placing region in a past frame prior to the previous frame is referred to so as to give hysteresis.

Referring to FIG. 16, a lateral axis indicates a frame number and a longitudinal axis indicates a sense line number of a touch panel. Values of Yp1 and Yp2, which are coordinates of points (Xp1, Yp1) and (Xp2, Yp2) at upper left and lower right, respectively, of a hand-placing region extracted with respect to each frame, are plotted in FIG. 16. For example, in a case of a frame number 1, Yp1=24 and Yp2=30 both before correction and after correction.

A line C1 indicates a result of plotting of Yp1 before correction in each frame. A line C2 indicates a result of plotting of Yp2 before correction in each frame. A line C3 indicates a result of plotting of Yp1 after correction in each frame. A line C4 indicates a result of plotting of Yp2 after correction in each frame.

Correction of Yp2 in a hand-placing region is made in such a manner that sequential frames are divided into intervals each with a certain variable FRAME_INTERVAL, and the maximum value in each interval is stored. For example, since pre-corrected Yp2=30 in a frame number 1, pre-corrected Yp2=32 in a frame number 2, pre-corrected Yp2=33 in a frame number 3, pre-corrected Yp2=34 in a frame number 4, and pre-corrected Yp2=33 in a frame number 5, the maximum value in an interval consisting of the frame numbers 1 to 5 is 34.

In a next frame, the maximum value in the previous interval is compared with a sense line number in the next frame to determine a larger value as a corrected value, and determine the corrected value as a new maximum value to be referred to. For example, in a case of a frame number 6, the maximum value 34 in the previous frame is compared with a current value 34 to determine 34 as a corrected value and determine 34 as a new maximum value.

In a case of a frame number 7, a current value is 35 whereas the maximum value to be referred to is 34, so that 35 which is a larger value is determined as a corrected value and determined as a new maximum value.

A similar process is repeated until a frame number 10 in the same interval. Since the maximum value of pre-corrected Yp2 in the interval consisting of frame numbers 6 to 10 is 35, 35 is determined as a maximum value to be referred to in a frame number 11 in a next interval.

As described above, frames are divided into certain intervals and the maximum value of Yp2 in each interval is obtained, and when a new maximum value is found, the maximum value of Yp2 is replaced with the newly found maximum value. This configuration requires only one memory region for storing the maximum value. Accordingly, even when a length of the interval is changed to be any length, it is unnecessary to change a hardware configuration. FIG. 16 illustrates an example in which one interval consists of 5 frames.

A description was provided above as to correction of Yp2 in a hand-placing region. Correction of Yp1 in the hand-placing region can be made similarly only by replacing calculation of the maximum value with calculation of the minimum value. Corrections of Xp1 and Xp2 in the hand-placing region can be made similarly.

A range H1 is a range from pre-corrected Yp1 to pre-corrected Yp2, and a range H2 is a range from corrected Yp1 to corrected Yp2. As a result of the correction, the range from Yp1 to Yp2 is expanded. After a hand placed on the touch panel is detached from the touch panel and a hand-placing state is stopped, the final corrected value is kept for a predetermined time (variable PALM_HOLD_FRAME).

By incorporating the above correction into extraction of a hand-placing region, it is possible to prevent wrong detection in a case of setting a non-detection region for a touch recognition process in a next frame in accordance with a result of extraction of a hand-placing region in a previous frame.

As described above, the detection section 5 detects a hand-placing region with respect to each frame during which a capacitance signal is read out from the touch panel 7, in accordance with a position specified by a minimum X coordinate Xp1 and a minimum Y coordinate Yp1 and a position specified by a maximum X coordinate Xp2 and a maximum Y coordinate Yp2 out of positions whose values of capacitance signals are more than a threshold. The correction section 21 provided in the hand-placing removing process section 2a corrects the maximum Y coordinate Yp2 per frame on a basis of the maximum value in a previous interval, and corrects the minimum Y coordinate Yp1 per frame on a basis of the minimum value in the previous interval.

Fourth Embodiment

Method for Changing the Number of Sequential Touches

FIG. 17 is a flowchart illustrating a method for changing the number of sequential touches with which number it is determined that a touch is detected, in accordance with Fourth Embodiment. This flowchart illustrates an algorithm which dynamically changes the number of sequential touches until the touch recognition section 4 determines that a touch is detected.

The touch recognition section 4 carries out a touch recognition process in such a manner that the touch recognition section 4 finds a portion having a large capacitance from a capacitance distribution map, and recognizes the portion as a touched position. The touch recognition section 4 carries out a touch information generation process in such a manner that the touch recognition section 4 generates, on a basis of a result of recognition of the touched position, touch information to be transmitted to the host device 13.

In order to avoid influence of a noise etc., only when a touch is recognized at the same position in sequential frames, it is determined that a touch is made, and touch information is transmitted to the host device 13. In FIG. 17, a variable nframe is used as the number of sequential frames, recognition of a touch at the same position in which number of sequential frames causes determination that a touch is made. As the value of nframe is larger, a time from when a user touches the touch panel 7 to a time when touch information is transmitted to the host device 13 is longer, which reduces a possibility of wrong detection due to noise etc.

In Fourth Embodiment, an input with a stylus is distinguished from a hand-placing state on a basis of a difference between a capacitance when a user touches a touch panel with a stylus and a capacitance in a hand-placing state, i.e. when a user touches a touch panel with a hand holding the stylus. However, in a case where a user slowly places a hand on the touch panel, a capacitance changes slowly, so that there is a possibility that a capacitance similar to that of the input with a stylus is observed while a user starts to place a hand. This raises a possibility that the hand-placing state is wrongly detected as an input with a stylus.

One solution to this problem is enlarging the variable nframe to avoid mixture of noises. However, this solution has a side effect that an input with a stylus requires a longer time for a touch with the stylus to be recognized, resulting in a decrease in writing performance. A method for solving this problem is illustrated in FIG. 17.

Initially, the touch recognition process is carried out (step S24).

Then, it is determined whether a hand-placing state where a hand holding a stylus touches a touch panel is detected (e.g.

determination can be made based on whether the coordinate Xp2 in a hand-placing region is 0 (initial value) or not) (step S25).

In a case where it is determined that the hand-placing state is not detected (No in step S25), the variable nframe is set to PALM_NFRAME to have a large value (e.g. 100) (step S27). In a case where it is determined that the hand-placing state is detected (Yes in step S25), the variable nframe is set to NFRAME to be dynamically changed to have a small value (e.g. 3). In a case where the step S26 or S27 is carried out, the touch information generation process is carried out (step S28).

As described above, in order to prevent a light touch just before the hand-placing state from being wrongly recognized as a touch with a stylus, the number of frames before determination of a touch is increased and the number of frames is set back to the original number of frames in the hand-placing state, so that wrong detection of a touch at start of the hand-placing state can be prevented and decrease in writing performance of an input with a stylus after start of the hand-placing state can be prevented.

In First to Fourth Embodiments, a description was made above as to a case of a capacitive touch sensor system. However, the present invention is not limited to this. The present invention is applicable to a touch sensor system other than the capacitive touch sensor system. For example, the present invention is applicable to an electromagnetic touch sensor system.

A description was made above as to a case where the hand-placing region is rectangular. However, the present invention is not limited to this case. The hand-placing region may have any shape other than a rectangle, such as a circle, an ellipse, and a triangle.

As described above, in the conventional art, it is necessary to specialize application software on the host device to have a hand-placing pad function. In contrast, according to the methods disclosed in First to Fourth Embodiments, normal application software can remove a hand-placing signal and detect a stylus input signal without wrong recognition. Accordingly, by replacing the conventional touch panel system with a touch panel system of the present invention, it is possible to carry out a hand-placing removing process.

(Other Aspects of the Present Embodiment)

It is preferable to arrange the touch sensor system in accordance with the present embodiment so as to further include replacing region setting means for setting a replacing region where the values of the capacitance signals are replaced with said nil value, said setting being based on the hand-placing region detected by the detection means, the hand-placing region and the replacing region each being rectangular, and a periphery of the replacing region being externally along a periphery of the hand-placing region.

With the arrangement, the hand-placing region which is a region of a touch panel including a plurality of capacitors provided in a matrix manner and on which region a hand is placed in order to make an input with a stylus can be automatically set by a simple configuration.

It is preferable to arrange the touch sensor system in accordance with the present embodiment so as to further include replacing region setting means for setting a replacing region where the values of the capacitance signals are replaced with said nil value, said setting being based on the hand-placing region detected by the detection means, the replacing region including (i) a horizontal region which includes the hand-placing region and which extends in a horizontal direction and (ii) a vertical region which includes the hand-placing region and which extends in a vertical direction, and the replacing region setting means switching the replacing region between the horizontal region and the vertical region every frames during each of which the capacitance signal is read out from the touch panel.

With the arrangement, it is possible to automatically set the hand-placing region while removing a phantom noise.

It is preferable to arrange the touch sensor system in accordance with the present embodiment such that the hand-placing region is rectangular, the detection means detects the hand-placing region with respect to each of a plurality of frames during each of which the capacitance signals are read out from the touch panel, said detecting being based on (i) a position specified by a minimum X coordinate Xp1 and a minimum Y coordinate Yp1 and (ii) a position specified by a maximum X coordinate Xp2 and a maximum Y coordinate Yp2 out of positions at which the values of the capacitance signals are more than a threshold, sequential ones of the plurality of frames constituting an interval, and the detection means correcting the maximum Y coordinate Yp2 with respect to said each of the plurality of frames on a basis of a maximum value in a previous interval right before an interval to which the frame belongs, and correcting the minimum Y coordinate Yp1 with respect to said each of the plurality of frames on a basis of a minimum value in the previous interval right before the interval to which the frame belongs.

Furthermore, it is preferable to arrange the touch sensor system in accordance with the present embodiment such that the hand-placing region is rectangular, the detection means detects the hand-placing region with respect to each of a plurality of frames during each of which the capacitance signals are read out from the touch panel, said detecting being based on (i) a position specified by a minimum X coordinate Xp1 and a minimum Y coordinate Yp1 and (ii) a position specified by a maximum X coordinate Xp2 and a maximum Y coordinate Yp2 out of positions at which the values of the capacitance signals are more than a threshold, sequential ones of the plurality of frames constituting an interval, and the detection means correcting the maximum X coordinate Xp2 with respect to said each of the plurality of frames on a basis of a maximum value in a previous interval right before an interval to which the frame belongs, and correcting the minimum X coordinate Xp1 with respect to said each of the plurality of frames on a basis of a minimum value in the previous interval right before the interval to which the frame belongs.

With the arrangements, a hand-placing region is extracted from a capacitance distribution map in a certain frame, and a hand-placing region is set with respect to a capacitance distribution map in a next frame on a basis of the result of the extraction. This makes it unnecessary to use a frame memory, thereby avoiding increase in costs due to use of a frame memory.

It is preferable to arrange the touch sensor system in accordance with the present embodiment such that the stylus input recognition means changes the number of sequential touches with which number it is determined that a touch is detected, said change being made in accordance with whether the detection means has detected the hand-placing region or not.

With the arrangement, when a hand-placing region is generated by a user slowly placing a hand, the number of sequential touches with which it is determined that a touch is detected can be increased, so that wrong detection of a touch due to noises can be reduced.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a touch sensor system which detects an input with a stylus to a touch panel including a plurality of capacitors provided in a matrix manner.

REFERENCE SIGNS LIST

1 Touch sensor system
2 Hand-placing removing process section
3 Capacitance distribution calculation section
4 Touch recognition section (stylus input recognition means)
5 Detection section (detection means)
6 Replacing section (replacing means)
7 Touch panel
8 Hand-placing parameter storage section
9 Driver
10 Sense amplifier
11 Timing generator
12 AD converter
13 Host device
14 Stylus
15 Hand
16a, 16b Hand-placing region
17 Stylus signal region
18 Capacitance distribution detecting circuit
19 Multiplexor
20 Replacing region setting section
21 Correction section
22 Storage section
23 Replacing section
23a Vertical region
23b Horizontal region

The invention claimed is:

1. A touch sensor system, comprising:
detection means for detecting a hand-placing region which is a region of a touch panel including a plurality of capacitors provided in a matrix manner and on which region a hand is placed in order to make an input with a stylus, said detecting being based on strengths of capacitance signals, each strength being indicative of a change in the corresponding capacitor;
replacing means for replacing values of capacitance signals corresponding to respective capacitors provided in the hand-placing region detected by the detection means with a nil value indicative of a state where no touch input is made; and
stylus input recognition means for outputting to a host device coordinates of the input with a stylus on a basis of (i) the capacitance signals replaced with said nil value by the replacing means and (ii) a capacitance signal corresponding to a capacitor provided outside the hand-placing region,
the touch sensor system further comprising replacing region setting means for setting a replacing region where the values of the capacitance signals are replaced with said nil value, said setting being based on the hand-placing region detected by the detection means,
the replacing region including (i) a horizontal region which includes the hand-placing region and which extends in a horizontal direction and (ii) a vertical region which includes the hand-placing region and which extends in a vertical direction, and
the replacing region setting means switching the replacing region between the horizontal region and the vertical region every frames during each of which the capacitance signal is read out from the touch panel.

2. A touch sensor system, comprising:
detection means for detecting a hand-placing region which is a region of a touch panel including a plurality of capacitors provided in a matrix manner and on which region a hand is placed in order to make an input with a stylus, said detecting being based on strengths of capacitance signals, each strength being indicative of a change in the corresponding capacitor;
replacing means for replacing values of capacitance signals corresponding to respective capacitors provided in the hand-placing region detected by the detection means with a nil value indicative of a state where no touch input is made; and
stylus input recognition means for outputting to a host device coordinates of the input with a stylus on a basis of (i) the capacitance signals replaced with said nil value by the replacing means and (ii) a capacitance signal corresponding to a capacitor provided outside the hand-placing region,
the hand-placing region being rectangular,
the detection means detecting the hand-placing region with respect to each of a plurality of frames during each of which the capacitance signals are read out from the touch panel, said detecting being based on (i) a position specified by a minimum X coordinate $Xp1$ and a minimum Y coordinate $Yp1$ and (ii) a position specified by a maximum X coordinate $Xp2$ and a maximum Y coordinate $Yp2$ out of positions at which the values of the capacitance signals are more than a threshold,
sequential ones of the plurality of frames constituting an interval, and
the detection means correcting the maximum Y coordinate $Yp2$ with respect to said each of the plurality of frames on a basis of a maximum value in a previous interval right before an interval to which the frame belongs, and correcting the minimum Y coordinate $Yp1$ with respect to said each of the plurality of frames on a basis of a minimum value in the previous interval right before the interval to which the frame belongs.

3. A touch sensor system, comprising:
detection means for detecting a hand-placing region which is a region of a touch panel including a plurality of capacitors provided in a matrix manner and on which region a hand is placed in order to make an input with a stylus, said detecting being based on strengths of capacitance signals, each strength being indicative of a change in the corresponding capacitor;
replacing means for replacing values of capacitance signals corresponding to respective capacitors provided in the hand-placing region detected by the detection means with a nil value indicative of a state where no touch input is made; and
stylus input recognition means for outputting to a host device coordinates of the input with a stylus on a basis of (i) the capacitance signals replaced with said nil value by the replacing means and (ii) a capacitance signal corresponding to a capacitor provided outside the hand-placing region,
the hand-placing region being rectangular,
the detection means detecting the hand-placing region with respect to each of a plurality of frames during each of which the capacitance signals are read out from the touch panel, said detecting being based on (i) a position specified by a minimum X coordinate $Xp1$ and a minimum Y coordinate $Yp1$ and (ii) a position specified by a maximum X coordinate Xp2 and a maximum Y coordinate Yp2 out of positions at which the values of the capacitance signals are more than a threshold, sequential ones of the plurality of frames constituting an interval, and the detection means correcting the maximum X coordinate Xp2 with respect to said each of the plurality of frames on a basis of a maximum value in a previous interval right before an interval to which the frame belongs, and correcting the minimum X coordinate Xp1 with respect to said each of the plurality of frames on a basis of a minimum value in the previous interval right before the interval to which the frame belongs.

4. A touch sensor system, comprising:

detection means for detecting a hand-placing region which is a region of a touch panel including a plurality of capacitors provided in a matrix manner and on which region a hand is placed in order to make an input with a stylus, said detecting being based on strengths of capacitance signals, each strength being indicative of a change in the corresponding capacitor;

replacing means for replacing values of capacitance signals corresponding to respective capacitors provided in the hand-placing region detected by the detection means with a nil value indicative of a state where no touch input is made; and stylus input recognition means for outputting to a host device coordinates of the input with a stylus on a basis of (i) the capacitance signals replaced with said nil value by the replacing means and (ii) a capacitance signal corresponding to a capacitor provided outside the hand-placing region, the stylus input recognition means changing the number of sequential touches with which number it is determined that a touch is detected, said change being made in accordance with whether the detection means has detected the hand-placing region or not.

* * * * *